United States Patent
Nakamura et al.

(10) Patent No.: US 12,354,566 B2
(45) Date of Patent: Jul. 8, 2025

(54) IMAGE DISPLAY DEVICE, IMAGE DISPLAY METHOD AND IMAGE DISPLAY PROGRAM

(71) Applicant: EIZO Corporation, Hakusan (JP)

(72) Inventors: Tomoya Nakamura, Hakusan (JP); Hiroki Matsuzaki, Hakusan (JP); Kazuya Murata, Hakusan (JP)

(73) Assignee: EIZO CORPORATION, Hakusan (JP)

( * ) Notice: Subject to any disclaimer, the term of this patent is extended or adjusted under 35 U.S.C. 154(b) by 0 days.

(21) Appl. No.: 18/723,867

(22) PCT Filed: Feb. 1, 2022

(86) PCT No.: PCT/JP2022/003816
§ 371 (c)(1),
(2) Date: Jun. 25, 2024

(87) PCT Pub. No.: WO2023/148814
PCT Pub. Date: Aug. 10, 2023

(65) Prior Publication Data
US 2025/0078771 A1    Mar. 6, 2025

(51) Int. Cl.
G09G 3/36    (2006.01)
(52) U.S. Cl.
CPC ..... *G09G 3/3607* (2013.01); *G09G 2300/023* (2013.01); *G09G 2320/0233* (2013.01); *G09G 2320/0276* (2013.01); *G09G 2360/16* (2013.01)

(58) Field of Classification Search
CPC .......... G09G 3/3607; G09G 2300/023; G09G 2320/0233; G09G 2320/0276; G09G 2360/16; G06T 5/70
See application file for complete search history.

(56) References Cited

U.S. PATENT DOCUMENTS

| | | |
|---|---|---|
| 2011/0279749 A1 | 11/2011 | Erinjippurath et al. |
| 2014/0002500 A1 | 1/2014 | Mizuno |

(Continued)

FOREIGN PATENT DOCUMENTS

| | | |
|---|---|---|
| JP | 2011-133683 A | 7/2011 |
| JP | 2014-011501 A | 1/2014 |

(Continued)

OTHER PUBLICATIONS

International Search Report issued on Apr. 19, 2022 in corresponding application No. PCT/JP2022/003816; 4 pgs.

*Primary Examiner* — Abdul-Samad A Adediran
(74) *Attorney, Agent, or Firm* — Maier & Maier, PLLC

(57) ABSTRACT

A display device that displays an image, including a light source; a plurality of display panels arranged in a stacked manner; a wide area smoothing unit; a narrow area smoothing unit; and a blending unit. The plurality of display panels include a first panel and a second panel disposed between the light source and the first panel, the wide area smoothing unit outputs a wide area smoothing value obtained by performing a smoothing processing on a luminance information value of a target area including a target pixel and surrounding pixels of the target pixel in an input image, the narrow area smoothing unit outputs a narrow area smoothing value obtained by performing a smoothing processing on a luminance information value of a target area that includes the target pixel and surrounding pixels of the target pixel and is smaller than the target area of the wide area smoothing unit.

9 Claims, 16 Drawing Sheets

(56) References Cited

U.S. PATENT DOCUMENTS

2018/0059465 A1   3/2018   Koudo et al.
2018/0286325 A1*  10/2018  Koudo .................. G06T 5/70
2020/0175946 A1   6/2020   Nakanishi et al.

FOREIGN PATENT DOCUMENTS

| JP | 2018-041056 A | 3/2018 |
| JP | 2019-090886 A | 6/2019 |
| JP | 2020-086380 A | 6/2020 |
| JP | 6746464 B2    | 8/2020 |

* cited by examiner

FIG. 7

$$V = \begin{array}{|c|c|c|c|c|} \hline v_{1,1} & v_{1,2} & v_{1,3} & v_{1,4} & v_{1,5} \\ \hline v_{2,1} & v_{2,2} & v_{2,3} & v_{2,4} & v_{2,5} \\ \hline v_{3,1} & v_{3,2} & v_{3,3} & v_{3,4} & v_{3,5} \\ \hline v_{4,1} & v_{4,2} & v_{4,3} & v_{4,2} & v_{4,5} \\ \hline v_{5,1} & v_{5,2} & v_{5,3} & v_{5,2} & v_{5,5} \\ \hline \end{array} \cdots$$

$$V'_l = \begin{array}{|c|c|c|c|c|} \hline v'_{l\_1,1} & v'_{l\_1,2} & v'_{l\_1,3} & v'_{l\_1,4} & v'_{l\_1,5} \\ \hline v'_{l\_2,1} & v'_{l\_2,2} & v'_{l\_2,3} & v'_{l\_2,4} & v'_{l\_2,5} \\ \hline v'_{l\_3,1} & v'_{l\_3,2} & v'_{l\_3,3} & v'_{l\_3,4} & v'_{l\_3,5} \\ \hline v'_{l\_4,1} & v'_{l\_4,2} & v'_{l\_4,3} & v'_{l\_4,2} & v'_{l\_4,5} \\ \hline v'_{l\_5,1} & v'_{l\_5,2} & v'_{l\_5,3} & v'_{l\_5,2} & v'_{l\_5,5} \\ \hline \end{array} \cdots$$

$$V'_s = \begin{array}{|c|c|c|c|c|} \hline V'_{s\_1,1} & V'_{s\_1,2} & V'_{s\_1,3} & V'_{s\_1,4} & V'_{s\_1,5} \\ \hline V'_{s\_2,1} & V'_{s\_2,2} & V'_{s\_2,3} & V'_{s\_2,4} & V'_{s\_2,5} \\ \hline V'_{s\_3,1} & V'_{s\_3,2} & V'_{s\_3,3} & V'_{s\_3,4} & V'_{s\_3,5} \\ \hline V'_{s\_4,1} & V'_{s\_4,2} & V'_{s\_4,3} & V'_{s\_4,2} & V'_{s\_4,5} \\ \hline V'_{s\_5,1} & V'_{s\_5,2} & V'_{s\_5,3} & V'_{s\_5,2} & V'_{s\_5,5} \\ \hline \end{array} \cdots$$

IMAGE DISPLAY DEVICE, IMAGE DISPLAY METHOD AND IMAGE DISPLAY PROGRAM

TECHNICAL FIELD

The present invention relates to an image display device, an image display method, and an image display program.

BACKGROUND

In order to improve the display quality of an image display device, a technology where a plurality of display panels are arranged in a stacked manner and an image is displayed on each display panel is proposed. In the display device disclosed in Patent Literature 1, a color image is displayed on a first display panel arranged on the front side of the display device, and a black and white image is displayed on a second display panel arranged on the back side of the first display panel. This makes it possible to particularly display low gradation areas of a display image with high quality and improve the contrast of the display device.

PATENT LITERATURE

[Patent Literature 1] The publication of Japanese Patent No. 6746464

SUMMARY

Pixels on the front display panel and corresponding pixels on the back display panel are separated from each other in the thickness direction of the display panel. Therefore, parallax in the degree of overlap between pixels occurs depending on the observer's line of sight. When the observer's line of sight is diagonal to the display screen, bright spots may disappear or double images may be perceived due to deviations in the degree of overlapping of pixels. In order to suppress such deterioration of display quality, the display device of Patent Literature 1 performs smoothing processing on black and white image data for the second display panel to smooth changes in luminance.

However, while smoothing processing can suppress deterioration of display quality due to parallax, interference patterns and halos are likely to occur depending on the input image.

The present invention has been made in view of such a circumstance. An object of the present invention is to improve display quality in display devices where a plurality of display panels are arranged.

The present invention provides a display device that displays an image, comprising: a light source; a plurality of display panels arranged in a stacked manner; a wide area smoothing unit; a narrow area smoothing unit; and a blending unit, wherein the plurality of display panels include a first panel and a second panel disposed between the light source and the first panel, the wide area smoothing unit outputs a wide area smoothing value obtained by performing a smoothing processing on a luminance information value of a target area including a target pixel and surrounding pixels of the target pixel in an input image, the narrow area smoothing unit outputs a narrow area smoothing value obtained by performing a smoothing processing on a luminance information value of a target area that includes the target pixel and surrounding pixels of the target pixel and is smaller than the target area of the wide area smoothing unit, the blending unit outputs a blend value obtained by blending the wide area smoothing value and the narrow area smoothing value at a predetermined blending rate, the second panel displays an image generated using the blend value, and the luminance information value is generated using a luminance of a pixel.

In the display device according to the present invention, a smoothing processing is performed on the luminance information values of target areas of different sizes, and an image displayed on the second panel is generated by using a blend value obtained by blending the smoothing processing values. While suppressing the deterioration of display quality due to parallax by smoothing processing, by blending the smoothing processing values of target areas that have a relatively wide and narrow relationship, it is possible to suppress the occurrence of interference patterns and halos, which are harmful effects of smoothing processing.

Various embodiments of the present invention are described below. Any of the embodiments described below can be combined with one another.

Preferably, the blending unit includes a blending rate determining unit and a blending processing unit, the blending rate determining unit calculates a luminance level using a luminance of the target pixel or a luminance of a neighboring area including the target pixel and neighboring pixels of the target pixel, and determines the blending rate based on the luminance level, and the blending processing unit outputs the blend value using the blending rate.

Preferably, the blending rate determining unit determines the blending rate so that the blending rate of the wide area smoothing value is monotonically non-decreasing with respect to the luminance level.

Preferably, the wide area smoothing unit includes a first preprocessing unit and a first smoothing processing unit, the first preprocessing unit generates the luminance information value used in the wide area smoothing unit by using at least one selected from a luminance of each pixel in an area including at least the target area of the wide area smoothing unit and a representative value of the luminance of each pixel, and the first smoothing processing unit outputs the wide area smoothing value obtained by performing smoothing processing on the luminance information value.

Preferably, the first preprocessing unit generates the luminance information value of the target area of the wide area smoothing unit by further using a gradation value of a color component of each pixel.

Preferably, the narrow area smoothing unit includes a second preprocessing unit and a second smoothing processing unit, the second preprocessing unit generates the luminance information value used in the narrow area smoothing unit by using at least one selected from a luminance of each pixel in an area including at least the target area of the narrow area smoothing unit, and a representative value of the luminance of each pixel, and the second smoothing processing unit outputs the narrow area smoothing value obtained by performing smoothing processing on the luminance information value.

Preferably, the second preprocessing unit generates the luminance information value of the target area of the narrow area smoothing unit by further using a gradation value of a color component of each pixel in the area including at least the target area of the narrow area smoothing unit.

Preferably, the smoothing processing is a processing using an averaging filter.

Another aspect of the present invention provides a method of displaying an image on a display device, comprising: a wide area smoothing step; a narrow area smoothing step; a blending step; and a display step, wherein the display device includes a light source and a plurality of display panels arranged in a stacked manner, the plurality of display panels include a first panel and a second panel disposed between the light source and the first panel, in the wide area smoothing step, a wide area smoothing value obtained by performing a smoothing processing on a luminance information value of a target area including a target pixel and surrounding pixels of the target pixel in an input image is output, in the narrow area smoothing step, a narrow area smoothing value obtained by performing a smoothing processing on a luminance information value of a target area that includes the target pixel and surrounding pixels of the target pixel and is smaller than the target area in the wide area smoothing step is output, in the blending step, a blend value obtained by blending the wide area smoothing value and the narrow area smoothing value at a predetermined blending rate is output, in the display step, an image generated using the blend value is displayed on the second panel, and the luminance information value is generated using a luminance of a pixel.

Another aspect of the present invention provides a program for causing a computer or a processor provided in a display device to execute a method of displaying an image on the display device, wherein the method comprises a wide area smoothing step, a narrow area smoothing step, a blending step, and a display step, the display device includes a light source and a plurality of display panels arranged in a stacked manner, the plurality of display panels include a first panel and a second panel disposed between the light source and the first panel, in the wide area smoothing step, a wide area smoothing value obtained by performing a smoothing processing on a luminance information value of a target area including a target pixel and surrounding pixels of the target pixel in an input image is output, in the narrow area smoothing step, a narrow area smoothing value obtained by performing a smoothing processing on a luminance information value of a target area that includes the target pixel and surrounding pixels of the target pixel and is smaller than the target area in the wide area smoothing step is output, in the blending step, a blend value obtained by blending the wide area smoothing value and the narrow area smoothing value at a predetermined blending rate is output, in the display step, an image generated using the blend value is displayed on the second panel, and the luminance information value is generated using a luminance of a pixel.

BRIEF DESCRIPTION OF DRAWINGS

FIG. 7 is a schematic diagram showing a two-dimensional array of luminance V.

FIG. 11 is a schematic diagram showing the luminance V of the neighboring area $A_{n\_m,n}$ used in a blending rate determining unit 88a.

DETAILED DESCRIPTION

Now, embodiments of the present invention will be described with reference to the drawings. Various features described in the embodiments below can be combined with each other. In addition, the present invention is established independently for each feature.

It is noted that in this specification, a "unit" may refer to, for example, a combination of hardware resources implemented by circuits in a broad sense and software information processing that can be concretely implemented by these hardware resources. In addition, although various information is handled in this embodiment, these information are expressed by the high and low signal values as a binary bit collection consisting of 0 or 1, and communication and calculations can be performed on a circuit in a broad sense. Further, a circuit in a broad sense is a circuit realized by at least appropriately combining a circuit, a circuitry, a processor, a memory, etc. In other words, a circuit in a broad sense includes application specific integrated circuit (ASIC), programmable logic device (for example, simple programmable logic device (SPLD)), complex programmable logic device (CPLD) and field programmable gate array (FPGA), etc.

1. OVERALL CONFIGURATION

Figure 1:
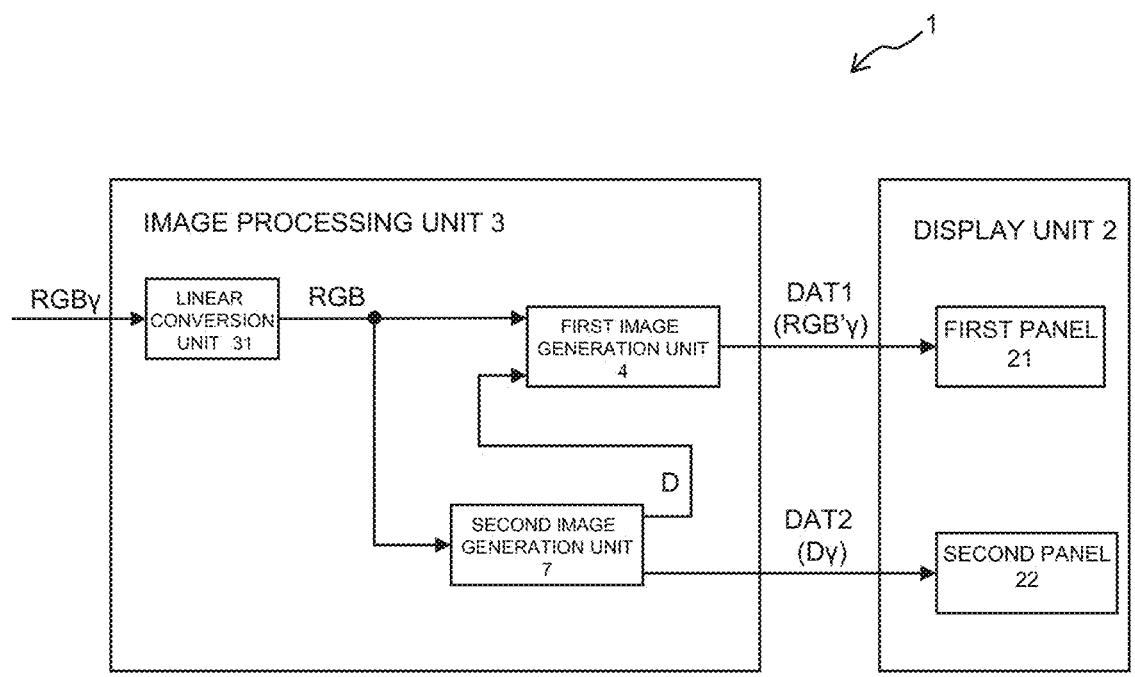
FIG. 1 is a block diagram showing the functional configuration of a display device 1 according to an embodiment of the present invention.
Figure 2:
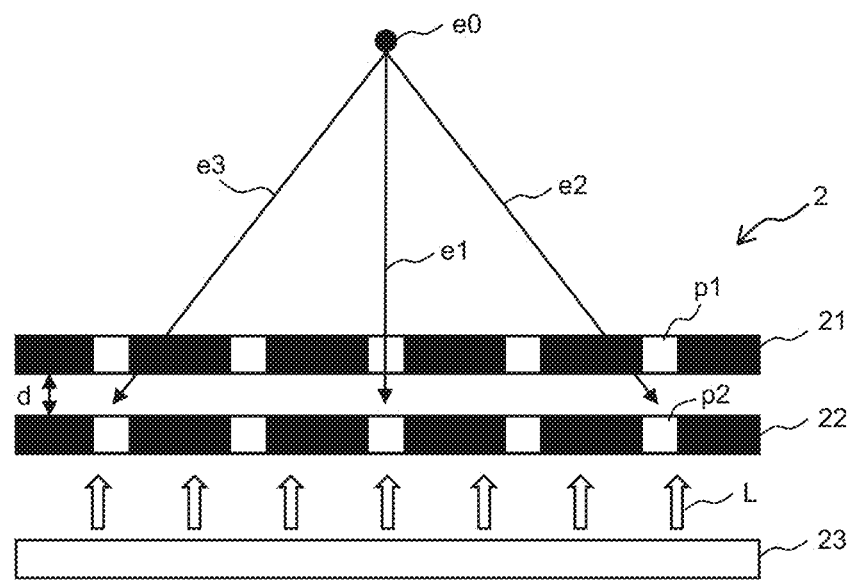
FIG. 2 is a schematic diagram showing the positional relationship between a display unit 2 of the display device 1 and the observer's viewpoint e0.

As shown in FIG. 1, a display device 1 according to the present embodiment includes a display unit 2 and an image processing unit 3. The display unit 2 and the image processing unit 3 are connected to each other by a signal cable so that they can communicate with each other. As shown in FIG. 2, the display unit 2 includes a light source 23 disposed on the back side of the display unit 2, and a plurality of display panels arranged in a stacked manner. The display unit 2 according to the present embodiment includes, as a plurality of display panels, two liquid crystal panels: a first panel 21 disposed on the front side of the display unit 2 and a second panel 22 disposed between the light source 23 and the first panel 21. When viewed from the viewpoint e0 of an observer located in front of the display unit 2, the second panel 22 is disposed at a position farther than the first panel 21. It is noted that in the following description, the entirety of a plurality of display panels (in this embodiment, the first panel 21 and the second panel 22) may be referred to as a stacked display panel.

The image processing unit 3 performs predetermined image processing on an input image and outputs first image data DAT1 and second image data DAT2 to the display unit 2. According to a control signal or data sent from the image processing unit 3 via the signal cable, the first panel 21 displays a first image based on the first image data DAT1, and the second panel 22 displays a second image based on the second image data DAT2. In this embodiment, the first panel 21 is a color liquid crystal panel and displays a first color image, and the second panel 22 is a monochrome liquid crystal panel and displays a second monochrome image.

The first panel 21 and the second panel 22 display the first image and the second image, respectively, and control a transmittance of a light L from the light source 23, so that a desired image is displayed on the stacked display panel. As shown in FIG. 2, a pixel p1 of the first panel 21 and a pixel p2 of the second panel 22 are separated by a distance d in a thickness direction of the display panel. Therefore, when the observer's line of sight is directed toward the front of the pixel (in the case of the line of sight e1 in FIG. 2), it is perceived as a high quality image. However, when the observer's line of sight is diagonal to the pixel (in the case of line of sight e2 and e3 in FIG. 2), due to the difference in the degree of overlapping between the pixel p1 and the pixel p2, there is a possibility that a bright spot disappears or a double image is perceived. In order to suppress such adverse effects associated with the use of the second panel 22, smoothing processing is performed when the image processing unit 3 generates the second image data DAT2.

2. IMAGE PROCESSING SECTION 3

Figure 3:
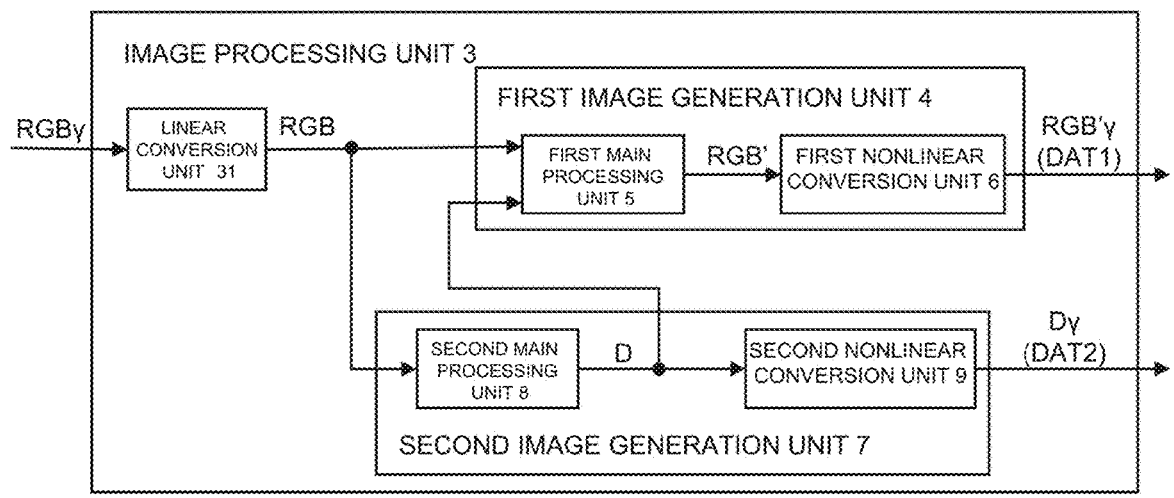
FIG. 3 is a block diagram showing the functional configuration of an image processing unit 3 of the display device 1.

Next, each component of the image processing unit 3 will be explained in detail. As shown in FIGS. 1 and 3, the image processing unit 3 of this embodiment includes a linear conversion unit 31, a first image generation unit 4, and a second image generation unit 7. The linear conversion unit 31 performs predetermined processing on the input image data and outputs it to the first image generation unit 4 and the second image generation unit 7. The first image generation unit 4 and the second image generation unit 7 generate first image data DAT1 and second image data DAT2, respectively.

2.1. Linear Conversion Unit 31

The linear conversion unit 31 receives, as input image data, an input signal RGBγ where the gradation is expressed with 10 bits for each of the R, G, and B components. Here, the input signal RGBγ is obtained by applying gamma correction according to gamma characteristics to the gradation of the input image. The linear conversion unit 31 generates a linear signal RGB converted so that each component of the input signal RGBγ exhibits a linear characteristic where the luminance increases linearly with an increase in the gradation value. In this embodiment, conversion into linear signals RGB is performed by using three LUTs (Lookup Tables) provided for each component.

2.2. Second Image Generation Unit 7

The second image generation unit 7 includes a second main processing unit 8 and a second nonlinear conversion unit 9. The second main processing unit 8 receives the linear signal RGB from the linear conversion unit 31, and generates a second processing signal D by performing predetermined processing including smoothing processing. It is noted that details of the processing performed by the second main processing unit 8 will be described later. The second nonlinear conversion unit 9 receives the second processing signal D from the second main processing unit 8, and converts the second processing signal D into a second image signal Dγ, which is a nonlinear signal by using the LUT generated based on the display characteristics of the second panel 22. The second image signal Dγ is output to the display unit 2 as second image data DAT2, and a second image based on the second image signal Dγ is displayed on the second panel 22.

2.3. First Image Generation Unit 4

Figure 4:
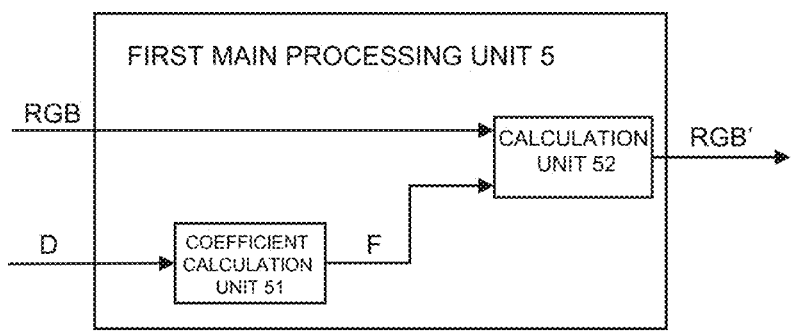
FIG. 4 is a block diagram showing the functional configuration of a first main processing unit 5.

The first image generation unit 4 includes a first main processing unit 5 and a first nonlinear conversion unit 6. As shown in FIG. 4, the first main processing unit 5 includes a coefficient calculation unit 51 and a calculation unit 52. The coefficient calculation unit 51 receives the second processing signal D from the second main processing unit 8 of the second image generation unit 7, and outputs a coefficient F associated with the second processing signal D by using a LUT. The calculation unit 52 receives a linear signal RGB from the linear conversion unit 31 and the coefficient F from the coefficient calculation unit 51, and generates the first processing signal RGB' by multiplying the linear signal RGB by the coefficient F. In this embodiment, the light emitted from the light source 23 is transmitted by the second display panel at a transmittance based on the second image data DAT2, and further transmitted by the first display panel at a transmittance based on the first image data DAT1. As a result, a desired transmittance according to input image data can be achieved in the stacked display panel. The coefficient F as output data that is associated with the second processing signal D as input data is stored in the LUT used by the coefficient calculation unit 51, based on the relationship between the transmittances of the first display panel and the second display panel.

The first nonlinear conversion unit 6 receives the first processing signal RGB' from the first main processing unit 5, converts the first processing signal RGB' into a first image signal RGB'γ which is a nonlinear signal by using an LUT generated for each color component based on the display characteristics of the first panel 21. The first image signal RGB'γ is output as first image data DAT1 to the display unit 2, and a first image based on the first image signal RGB'γ is displayed on the first panel 21.

In the image processing unit 3 of this embodiment, the linear conversion unit 31 performs conversion into a linear signal prior to processing by the first main processing unit 5 and the second main processing unit 8. Further, the first processing signal RGB' and the second processing signal D generated by the first main processing unit 5 and the second main processing unit 8 are converted into nonlinear signals by the first nonlinear conversion unit 6 and the second nonlinear conversion unit 9 and output to the display unit 2. In such a configuration, processing by the first main processing unit 5 and the second main processing unit 8 is performed for a linear signal equivalent to the gradation seen through the stacked display panel. Therefore, in the first main processing unit 5, it is possible to perform processing based more accurately on the colors displayed when a plurality of display panels are combined. In the second main processing unit 8, it is possible to obtain more appropriate results in smoothing processing, etc.

3. SECOND MAIN PROCESSING UNIT 8

Figure 5A:
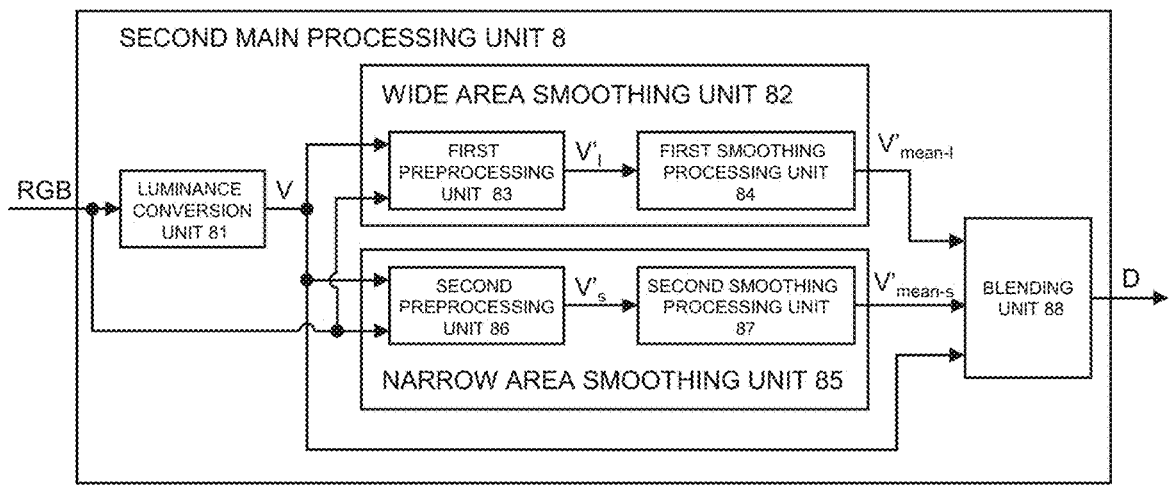
FIG. 5A is a block diagram showing the functional configuration of a second main processing unit 8. FIG.
Figure 5B:
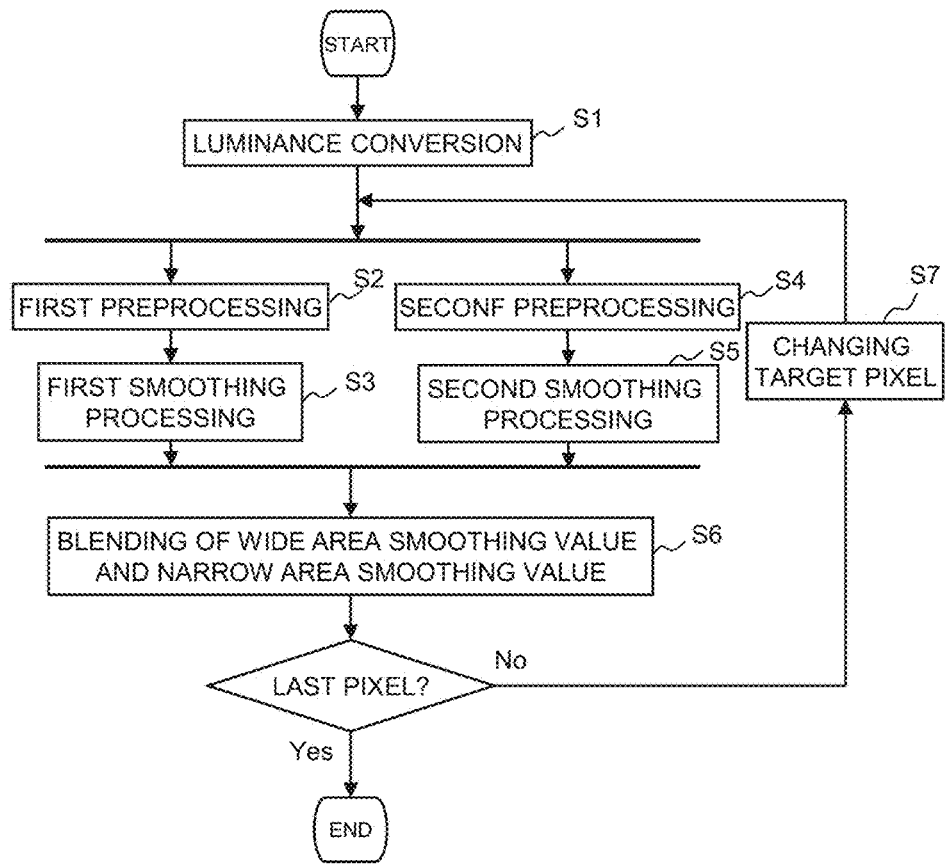
FIG. 5B is a flow diagram showing the processing in the second main processing unit 8.

Next, the processing performed by the second main processing unit 8 will be described in detail. As shown in FIG. 5A, the second main processing unit 8 includes a luminance conversion unit 81, a wide area smoothing unit 82, a narrow area smoothing unit 85, and a blending unit 88. FIG. 5B is a flow diagram showing the processing in the second main processing unit 8.

3.1. Luminance Conversion Unit 81

Figure 6:
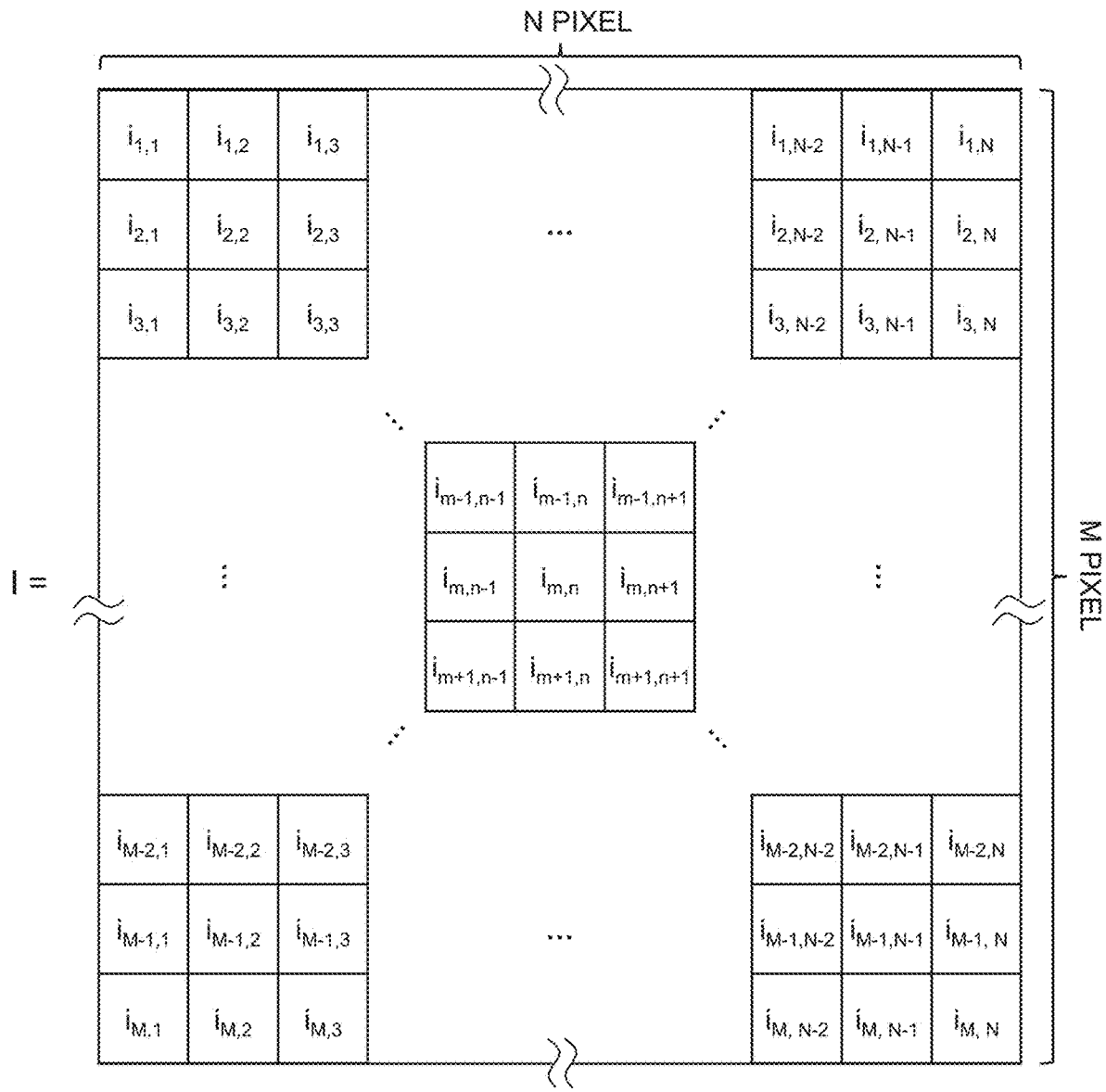
FIG. 6 is a schematic diagram showing a pixel array I of an input image.

The luminance conversion unit 81 receives the linear signal RGB and outputs the luminance V based on the gradation value of each pixel in the input image (step S1 in FIG. 5B). The luminance conversion unit 81 of this embodiment outputs the maximum value as luminance V among the gradation values of each color component of each pixel. FIG. 6 shows a pixel array I of an input image in this embodiment, and the pixel array I has M×N pixels. Based on the pixel at the upper left corner of FIG. 6, the pixel in the mth row and nth column is expressed as $i_{m,n}$. When the value obtained by normalizing each component of the gradation value of pixels $i_{m,n}$ in the input image in the range of 0 to 1 in the linear signal RGB is ($R_{m,n}$, $G_{m,n}$, $B_{m,n}$), as expressed by equation (1), the maximum value among $R_{m,n}$, $G_{m,n}$, and $B_{m,n}$ is used as the luminance $v_{m,n}$ of the pixel $i_{m,n}$.

$$v_{m,n} = \max \{R_{m,n}, G_{m,n}, B_{m,n}\} \quad (1)$$

$$(0 \leq R_{m,n}, G_{m,n}, B_{m,n} \leq 1)$$

The luminance conversion unit 81 outputs luminance V which is a two-dimensional array of luminance $v_{m,n}$ of each pixel $i_{m,n}$ as shown in FIG. 7. It is noted that the method for calculating the luminance V is not limited to the above example, and for example, the gradation values of each color component of each pixel may be weighted, and the sum of these values may be output as the luminance V.

3.2. Wide Area Smoothing Unit 82 and Narrow Area Smoothing Unit 85

The wide area smoothing unit 82 and the narrow area smoothing unit 85 perform smoothing processing on the luminance information values V'$_l$ and V'$_s$, which are information about the luminance V, and respectively output the wide area smoothing value V'$_{mean-l}$ and the narrow area smoothing value V'$_{mean-s}$. The luminance information values V'$_l$ and V'$_s$ are generated by using the luminance V. Here, the wide area smoothing unit 82 performs smoothing processing on the luminance information value V'$_l$ of the target area A$_l$ including the target pixel in the input image and the surrounding pixels of the target pixel. On the other hand, the narrow area smoothing unit 85 performs smoothing processing on the luminance information value V'$_s$ of the target area A$_s$ including the target pixel and surrounding pixels of the target pixel and being smaller than the target area A$_l$ of the wide area smoothing unit 82.

Figures 8A, 8B:
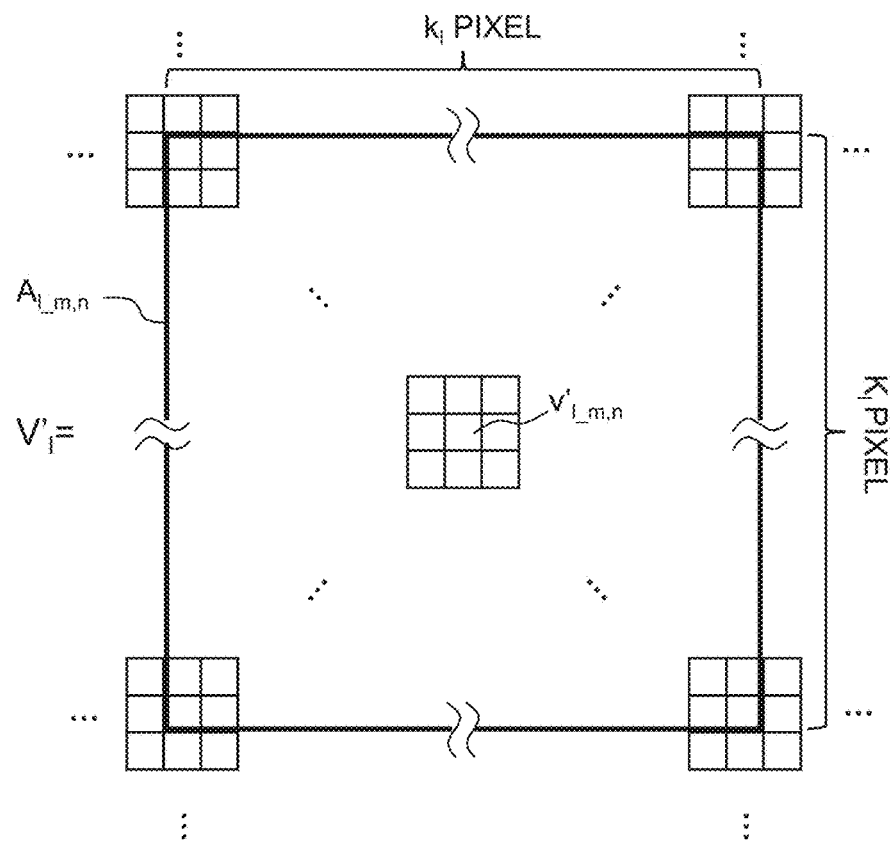
FIG. 8A is a schematic diagram showing a two-dimensional array of luminance information values $V'_l$ used in a wide area smoothing unit 82.
FIG. 8B is a schematic diagram showing the luminance information value $V'_l$ of the target area $A_{l\_m,n}$ in the wide area smoothing unit 82.

The wide area smoothing unit 82 includes a first preprocessing unit 83 and a first smoothing processing unit 84, as shown in FIG. 5A. The first preprocessing unit 83 performs predetermined preprocessing on the luminance V (step S2 in FIG. 5B), and outputs luminance information value V'$_l$ which is a two-dimensional array of luminance information values v'$_{l\_m,n}$ of each pixel $i_{m,n}$ as shown in FIG. 8A. It is noted that details of the processing performed by the first preprocessing unit 83 will be described later.

When the target pixel is the mth row and nth column pixel $i_{m,n}$, and the target area A$_l$ corresponding to the target pixel $i_{m,n}$ is expressed as A$_{l\_m,n}$, then the target area A m,n is set to be an area consisting of a total of $k_l \times k_l$ pixels approximately centered on the target pixel $i_{m,n}$ and including the target pixel $i_{m,n}$ and its surrounding pixels. k$_l$ is, for example, 99 to 999, preferably 149 to 599, and is set to k$_l$=301 in this embodiment. Specifically, k$_l$ is, for example, 99, 199, 299, 399, 499, 599, 699, 799, 899, 999, and may be within the range between any two of the numerical values exemplified here. The first smoothing processing unit 84 performs smoothing processing on the luminance information value V'$_l$ of the target area A$_{l\_m,n}$ indicated by a thick line in FIG. 8B (wide area smoothing step, step S3 in FIG. 5B). As a result, the wide area smoothing value v'$_{mean-l\_m,n}$ for the target pixel $i_{m,n}$ is obtained.

The smoothing processing by the first smoothing processing unit 84 is performed on a relatively large target area A$_{l\_m,n}$ for the purpose of suppressing interference patterns. The size $k_l \times k_l$ of the target area A$_{l\_m,n}$ is not limited to the example of this embodiment, but considering the size of the display panel and the expected range of the observer's viewing angle with respect to the stacked display panel, it is determined to be large enough so that the interference pattern is not perceived even when the line of sight is diagonal to the stacked display panel. It is noted that the target area A$_{l\_m,n}$ in this embodiment is configured with the same number of pixels (k$_l$) in the row and column directions, but the target area A$_{l\_m,n}$ may be set to include different numbers of pixels in the row and column directions.

The first smoothing processing unit 84 of this embodiment performs smoothing processing by using an averaging filter with a filter size of $k_l \times k_l$ for the luminance information value V'$_l$ of the target area A$_{l\_m,n}$ determined in this way. Therefore, the wide area smoothing value v'$_{mean-l\_m,n}$ is a value obtained by dividing the sum of luminance information values V' of pixels in the target area A$_{l\_m,n}$ by $k_l \times k_l$.

Figures 9A, 9B:
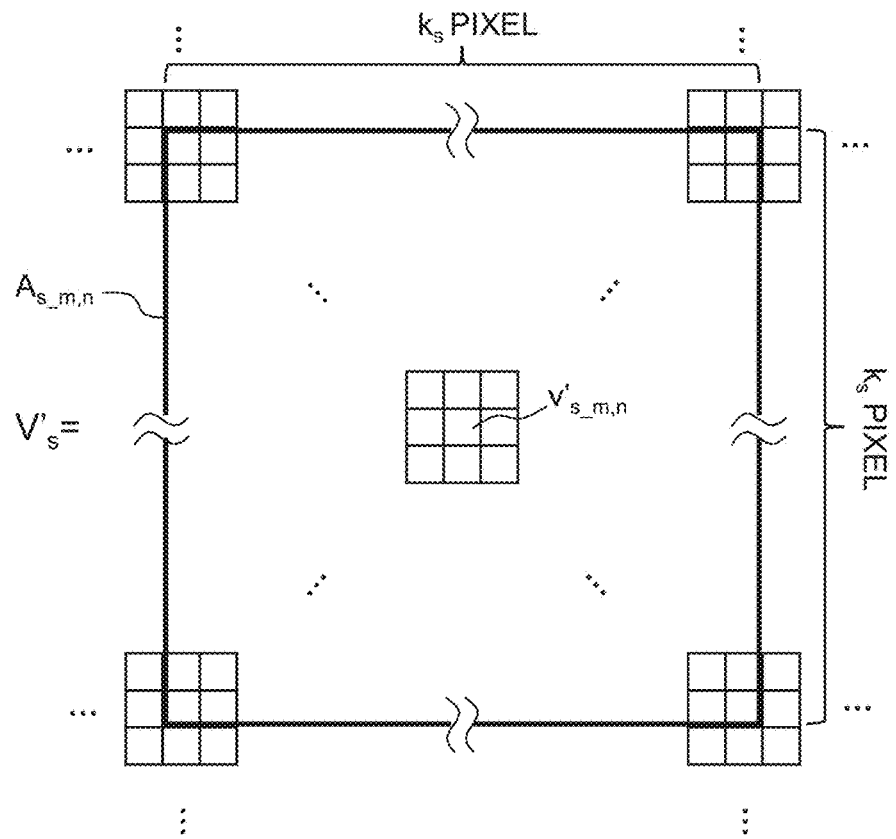
FIG. 9A is a schematic diagram showing a two-dimensional array of luminance information values $V'_s$ used in a narrow area smoothing unit 85.
FIG. 9B is a schematic diagram showing the luminance information value $V'_s$ of the target area $A_{s\_m,n}$ in the narrow area smoothing unit 85.

The narrow area smoothing unit 85 includes a second preprocessing unit 86 and a second smoothing processing unit 87, as shown in FIG. 5A. The second preprocessing unit 86 performs predetermined preprocessing on the luminance V output from the luminance conversion unit 81 (step S4 in FIG. 5B), and outputs luminance information value V'$_s$ which is a two-dimensional array of luminance information values v'$_{s\_m,n}$ of each pixel $i_{m,n}$ as shown in FIG. 9A. It is noted that details of the processing performed by the second preprocessing unit 86 will be described later.

When the target area $A_s$ corresponding to the target pixel $i_{m,n}$ is expressed as $A_{s\_m,n}$, the target area $A_{s\_m,n}$ is set to be an area consisting of a total of $k_s \times k_s$ pixels approximately centered on the target pixel $i_{m,n}$ and including the target pixel $i_{m,n}$ and its surrounding pixels. $k_s$ is, for example, 5 to 61, preferably 11 to 39, and is set to 15 in this embodiment. Specifically, $k_s$ is, for example, 5, 13, 21, 29, 37, 45, 53, 61, and may be within a range between any two of the numerical values exemplified here. The second smoothing processing unit 87 performs a smoothing processing on the luminance information value $V'_s$ of the target area $A_{s\_m,n}$ indicated by a thick line in FIG. 9B (narrow area smoothing step, step S5 in FIG. 5B). As a result, the narrow area smoothing value $v'_{mean-s\_m,n}$ for the target pixel $i_{m,n}$ is obtained.

The target area $A_{s\_m,n}$ for the smoothing processing by the second smoothing processing unit 87 is set to be smaller than the target area $A_{l\_m,n}$ for the smoothing processing by the first smoothing processing unit 84. In this embodiment, the target area $A_{s\_m,n}$ is set so that the relationship $k_s < k_l$ is satisfied and the target area $A_{s\_m,n}$ of the second smoothing processing unit 87 becomes a part of the target area $A_{l\_m,n}$ of the first smoothing processing unit 84. The smoothing processing by the second smoothing processing unit 87 is performed on a relatively small target area $A_{s\_m,n}$ for the purpose of suppressing the disappearance of bright spots due to a difference in the degree of overlap between the pixels of the first panel 21 and the second panel 22 when the observer's line of sight is diagonal to the stacked display panel. The target area $A_{s\_m,n}$ is determined to have a minimum size $k_s \times k_s$ to the extent that the disappearance of the bright spot is not perceived even when the line of sight is diagonal to the stacked display panel, considering the distance between the pixels of the first panel 21 and the second panel 22 in the thickness direction of the display panel and the angle of the observer's line of sight with respect to the stacked display panel. If the size of the target area $A_{s\_m,n}$ of the second smoothing processing unit 87 is 1/a times the size of the target area $A_{l\_m,n}$ of the first smoothing processing unit 84, for example, $5 \leq a \leq 50$, preferably $10 \leq a \leq 40$, and a in this embodiment is about 20. Specifically, a is, for example, 5, 10, 15, 20, 25, 30, 35, 40, 45, 50, and may be within the range between any two of the numerical values exemplified here. It is noted that the target area $A_{s\_m,n}$ in this embodiment is configured with the same number of pixels ($k_s$) in the row and column directions, but the target area $A_{s\_m,n}$ may be set to be configured with different numbers of pixels in the row and column directions.

The second smoothing processing unit 87 performs smoothing processing on the luminance information value $V'_s$ of the target area $A_{s\_m,n}$ determined in this way, and performs smoothing processing by using an averaging filter with a filter size of $k_s \times k_s$. Therefore, the narrow area smoothing value $v'_{mean-s\_m,n}$ is a value obtained by dividing the sum of luminance information values $V'$ of pixels in the target area $A_{s\_m,n}$ by $k_s \times k_s$.

The first smoothing processing unit 84 and the second smoothing processing unit 87 of this embodiment perform smoothing processing by using an averaging filter. Compared to a low-pass filter (LPF) such as a Gaussian filter that applies weight according to distance, the averaging filter maintains a constant gradation gradient in the image after smoothing processing. Thereby, it is possible to reduce interference patterns caused by the relative positions of the first panel 21 and the second panel 22 appearing to be shifted. In other words, by using an averaging filter whose attenuation range is wide both spatially and in frequency as the LPF, it is possible to reduce interference in a wide range.

3.3. Blending Unit 88

Figure 10:
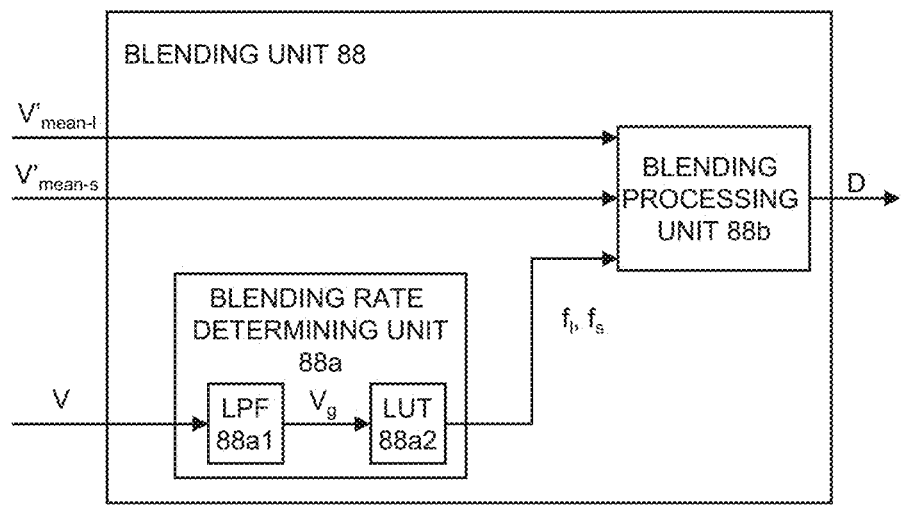
FIG. 10 is a block diagram showing the functional configuration of a blending unit 88.

The blending unit 88 receives the wide area smoothing value $V'_{mean-l}$ from the wide area smoothing unit 82 and the narrow area smoothing value $V'_{mean-s}$ from the narrow area smoothing unit 85, blends them at a predetermined blending rate, and outputs a blend value as the second processing signal D. As shown in FIG. 10, the blending unit 88 includes a blending rate determining unit 88a and a blending processing unit 88b.

The blending rate determining unit 88a receives the luminance V from the luminance conversion unit 81, and calculates the luminance level $V_g$ by using the luminance V of the target pixel or the luminance V of a neighboring area $A_n$ including the target pixel and neighboring pixels of the target pixel. Further, the blending rate determining unit 88a determines the blending rates $f_l$ and $f_s$ based on the luminance level $V_g$. The blending rates $f_l$ and $f_s$ are used to weight each smoothing value as shown in equation (2) when blending the wide area smoothing value $V'_{mean-l}$ and the narrow area smoothing value $V'_{mean-s}$.

$$D = f_l \times V'_{mean-l} + f_s \times V'_{mean-s} \quad (2)$$

$$(0 \leq f_l, f_s \leq 1, \text{ and } f_s = 1 - f_l)$$

Figure 11:
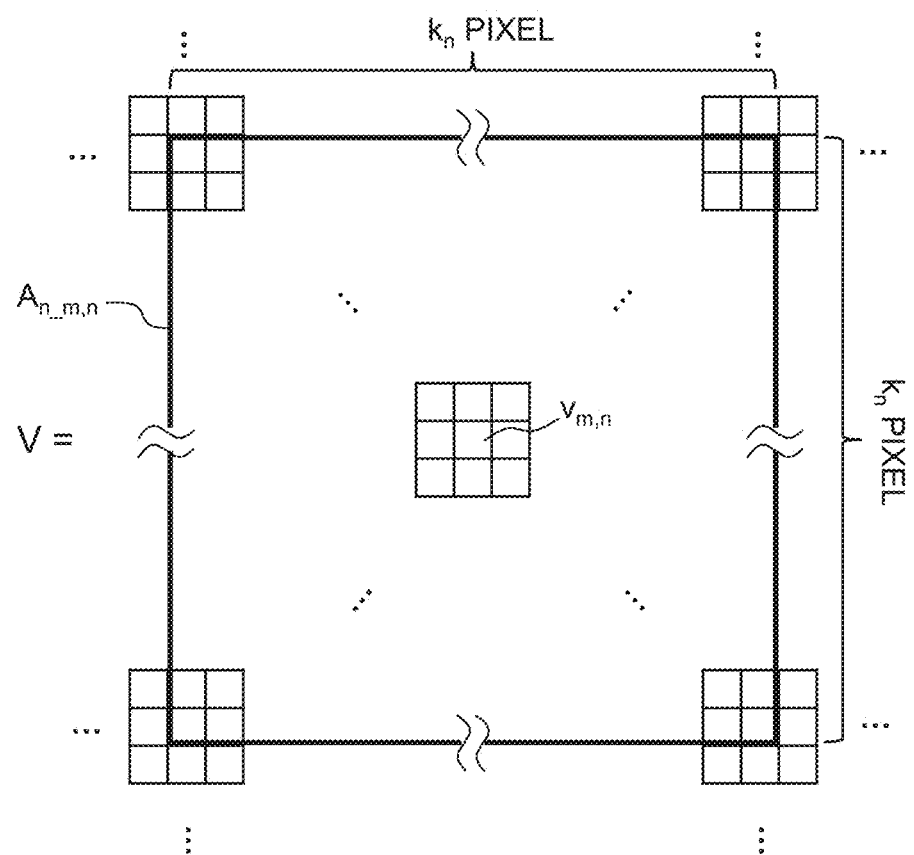

When the neighboring area $A_n$ corresponding to the target pixel $i_{m,n}$ is expressed as $A_{n\_m,n}$, the neighboring area $A_{n\_m,n}$ of this embodiment is set to be an area approximately centered on $i_{m,n}$ and consisting of a total of $k_n \times k_n$ pixels including the target pixel $i_{m,n}$ and its neighboring pixels. In this embodiment, $k_n$ is set to 9. The blending rate determining unit 88a of this embodiment performs processing by using the LPF 88a1 based on Gaussian distribution on the luminance V of the neighboring area $A_{n\_m,n}$ indicated by the thick line in FIG. 11, and calculates the luminance level $v_{g\_m,n}$ for the target pixel $i_{m,n}$. The LPF 88a1 is for weighting the luminance V of the neighboring area $A_{n\_m,n}$ according to the distance from the target pixel $i_{m,n}$, and this makes it possible to obtain a luminance level $v_{g\_m,n}$ that reflects the distribution of luminance V in the neighboring area $A_{n\_m,n}$. It is noted that the weighting by the LPF 88a1 is not limited to the configuration of this embodiment that follows a Gaussian distribution, and other weighting methods may be used.

If the size of the neighboring area $A_{n\_m,n}$ is too large, the distribution of luminance V in the vicinity of the target pixel $i_{m,n}$ cannot be appropriately reflected in the luminance level $v_{g\_m,n}$, and the processing performance of the blending unit 88 deteriorates. Therefore, the size of the neighboring area $A_{n\_m,n}$ is preferably set to be smaller than or equal to the size of the target area $A_{l\_m,n}$ in the wide area smoothing unit 82, and is more preferably set to be smaller than or equal to the size of the target area $A_{s\_m,n}$ in the narrow area smoothing unit 85. In this embodiment, the size of the neighboring area $A_{n\_m,n}$ is set smaller than the size of the target area $A_{s\_m,n}$ in the narrow area smoothing unit 85 ($k_n=9$ for $k_s=15$). It is noted that the neighboring area $A_{n\_m,n}$ in this embodiment is composed of the same number of pixels ($k_n$ pieces) in the row direction and the column direction. However, the neighboring area $A_{n\_m,n}$ may be set so that it is composed of different numbers of pixels in the row direction and column direction.

It is noted that the method for calculating the luminance level $v_{g\_m,n}$ is not limited to the example of this embodiment, and the luminance $v_{m,n}$ of the target pixel $i_{m,n}$ may be used as it is as the luminance level $v_{g\_m,n}$.

The blending rate determining unit 88a determines the blending rate $f_{l\_m,n}$ corresponding to the luminance level $v_{g\_m,n}$ of the target pixel $i_{m,n}$ by using the LUT 88a2 where the blending rate $f_l$ of the wide area smoothing value $V'_{mean-l}$ is stored as output data associated with the luminance level $V_g$ as input data. The LUT 88a2 where the blending rate $f_l$ is stored is generated in accordance with the performance of the first panel 21 in expressing low gradation areas, the ease where interference patterns are perceived depending on the size of the actual display panel, etc. Here, it is preferable that the blending rate $f_l$ of the wide area smoothing value $V'_{mean-l}$ is monotonically non-decreasing with respect to the luminance level $V_g$. In other words, it is preferable that the blending rate $f_s$ of the narrow area smoothing value $V'_{mean-s}$ is monotonically non-increasing with respect to the luminance level $V_g$. Furthermore, it is more preferable to determine the blending rates $f_l$ and $f_s$ so that in areas where the luminance level $V_g$ is relatively high, the blending rate $f_l$ of the wide area smoothing value $V_{mean-l}$ is larger than the blending rate $f_s$ of the narrow area smoothing value $V'_{mean-s}$, and in areas where the luminance level $V_g$ is relatively low, the blending rate $f_s$ of the narrow area smoothing value $V'_{mean-s}$ is larger than the blending rate $f_l$ of the wide area smoothing value $V'_{mean-l}$. This makes it possible to suppress the occurrence of interference patterns in the displayed image and to suppress deterioration in display quality in low gradation areas.

Figure 12:
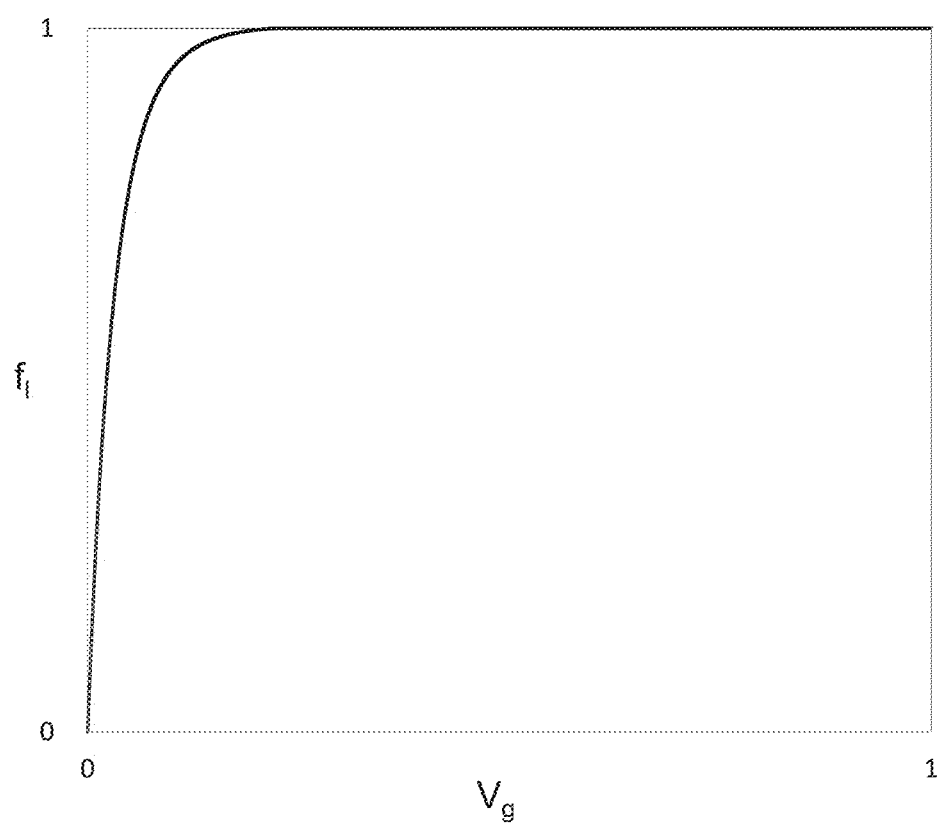
FIG. 12 is a graph showing an example of the relationship between the luminance level $V_g$ and the blending rate $f_l$ of the wide area smoothing value $V'_{mean-l}$.

FIG. 12 is a graph showing an example of the relationship between the luminance level $V_g$ in the LUT 88a2 and the blending rate $f_l$ of the wide area smoothing value $V'_{mean-l}$. In an area where the luminance level $V_g$ is low, the blending rate $f_l$ increases monotonically, and in an area where the luminance level $V_g$ is medium to high, the blending rate $f_l$ remains approximately constant. It is noted that the relationship between the luminance level $V_g$ and the blending rate $f_l$ is not limited to this example. For example, it may be a monotonically non-decreasing relationship in the form of an S-shaped curve, or a monotonically non-decreasing relationship in the form of a step function.

By using the blending rate $f_{l\_m,n}$ obtained in this way, the blending processing unit 88b calculates the blending value $d_{m,n}$ for the pixel $i_{m,n}$ using equation (2) (blending step, step S6 in FIG. 5B). Furthermore, the wide area smoothing unit 82, the narrow area smoothing unit 85, and the blending unit 88 repeat the above processing while changing the target pixel $i_{m,n}$ (step S7 in FIG. 5B). A two-dimensional array of blending values $d_{m,n}$ for all pixels is output as the second processing signal D.

When the second image data DAT2 is generated by using only the wide area smoothing value $V'_{mean-l}$ obtained by performing smoothing processing on a relatively large target area $A_l$ by the wide area smoothing unit 82, interference patterns become less perceivable in images displayed on the stacked display panel. On the other hand, a so-called white halo, in which a vaguely bright area appears from a high gradation area to a low gradation area in an image, tends to spread over a wide range, and the display quality of the low gradation area may deteriorate. When the second image data DAT2 is generated by using only the narrow area smoothing value $V'_{mean-s}$ obtained by performing smoothing processing on $A_s$ having the minimum size by the narrow area smoothing unit 85, although the occurrence of white halo can be suppressed to a narrow range, the interference pattern becomes more perceivable in the displayed image.

In the present invention, by blending the wide area smoothing value $V'_{mean-l}$ and the narrow area smoothing value $V'_{mean-s}$, it is possible to enjoy the effect of suppressing interference patterns, which is an advantage of using the wide area smoothing value $V'_{mean-l}$, while suppressing the deterioration of display quality in the low gradation region due to white halos, which is a harmful effect of using the wide area smoothing value $V'_{mean-l}$.

Further, in the present invention, the wide area smoothing unit 82 and the narrow area smoothing unit 85 perform smoothing processing on luminance information values in parallel and independently. If the smoothing processing is performed serially, where the result of smoothing by one smoothing unit is further smoothed by the other smoothing unit, there is a possibility that the smoothing processing will be excessive and the contrast will be reduced, or the effect of smoothing by the other smoothing unit will be lost. The above situation can be avoided by performing smoothing processing for different sizes of the target area independently and blending the results.

Further, the interference pattern is easily perceived in areas of intermediate gradation or higher, and is difficult to be perceived in low gradation areas. By setting the blending rate $f_l$ of the wide area smoothing value $V'_{mean-l}$ to be monotonically non-decreasing with respect to the luminance level $V_g$ as described above, in an area where the luminance level $V_g$ is relatively high, the ratio of the wide area smoothing value $V'_{mean-l}$ in blending can be increased to enhance the interference pattern suppression effect, in an area where the luminance level $V_g$ is relatively low, the ratio of the narrow area smoothing value $V'_{mean-s}$ in blending can be increased to enhance the effect of suppressing deterioration of display quality in a low gradation area.

3.4. First Preprocessing Unit 83 and Second Preprocessing Unit 86

<Overall Configuration of First Preprocessing Unit 83>

Figure 13A:
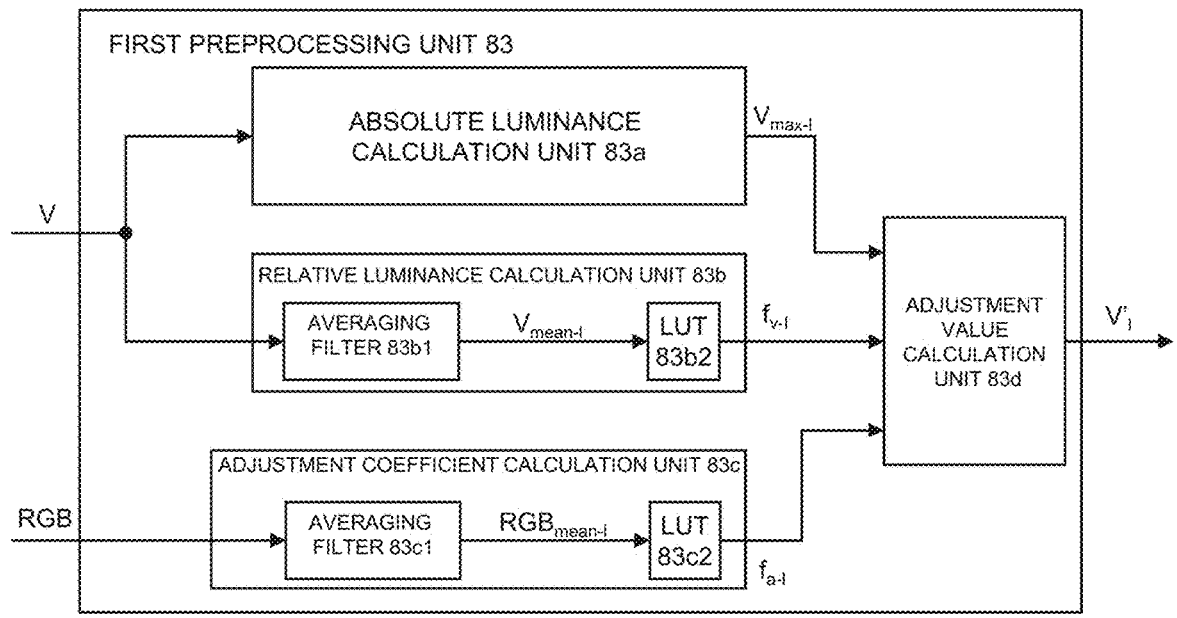
FIG. 13A is a block diagram showing the functional configuration of a first preprocessing unit 83.

As shown in FIG. 13A, the first preprocessing unit 83 of the wide area smoothing unit 82 includes an absolute luminance calculation unit 83a, a relative luminance calculation unit 83b, an adjustment coefficient calculation unit 83c, and an adjustment value calculation unit 83d. The absolute luminance calculation unit 83a receives the luminance V from the luminance conversion unit 81, and outputs the luminance maximum value $V_{max-l}$ in the attention area $B_l$ including the target pixel.

The relative luminance calculation unit 83b receives the luminance V data from the luminance conversion unit 81, applies the averaging filter 83b1 to the luminance V in the attention area Bi including the target pixel, and calculates the luminance average value $V_{mean-l}$. Furthermore, the relative luminance calculation unit 83b determines a corresponding value $f_{v-l}$ corresponding to the luminance average value $V_{mean-l}$ by using the LUT 83b2.

The adjustment coefficient calculation unit 83c determines the adjustment coefficient $f_{a-l}$ by using the gradation value of each color component of the pixel. The adjustment coefficient calculation unit 83c of this embodiment applies the averaging filter 83c1 to the linear signal RGB in the attention area $B_l$ including the target pixel, and calculates the gradation average value $RGB_{mean-l}$. Then, the adjustment coefficient $f_{a-l}$ corresponding to the gradation average value $RGB_{mean-l}$ is determined by using the LUT 83c2.

The adjustment value calculation unit 83d receives the luminance maximum value $V_{max-l}$ from the absolute luminance calculation unit 83a and the corresponding value $f_{v-l}$ from the relative luminance calculation unit 83b, and calculates the luminance lower limit value $V_{limit-l}$ based on equations (3) and (4). is set.

$$V_{max-1} < f_{v-1} \Rightarrow V_{limit-1} = f_{v-1} \quad (3)$$

$$V_{max-1} \geq f_{v-1} \Rightarrow V_{limit-1} = V_{max-1} \quad (4)$$

Furthermore, the adjustment value calculation unit 83d receives the adjustment coefficient $f_{a-l}$ from the adjustment coefficient calculation unit 83c, and calculates the luminance information value $V'_l$ used in the wide area smoothing unit 82 based on equation (5).

$$V'_1 = 1 - f_{a-1} \times (1 - V_{limit-1}) \quad (5)$$

It is noted that the first preprocessing unit 83 is not limited to the above configuration, and may include only one or two of the absolute luminance calculation unit 83a, the relative luminance calculation unit 83b, and the adjustment coefficient calculation unit 83c.

<Overall Configuration of Second Preprocessing Unit 86>

Figure 13B:
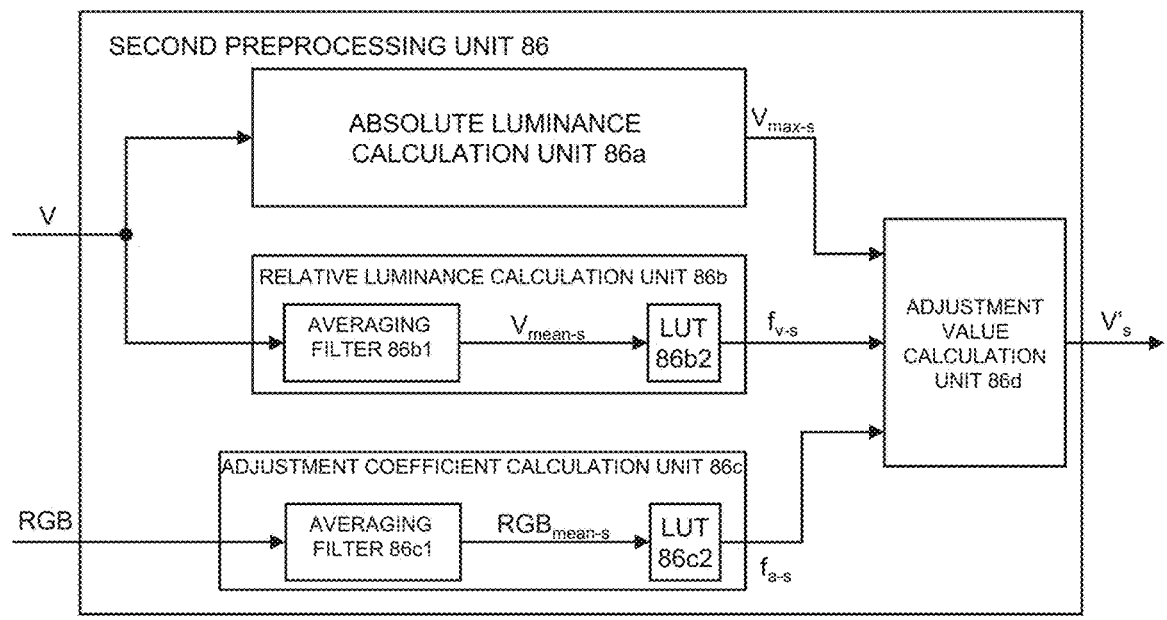
FIG. 13B is a block diagram showing the functional configuration of a second preprocessing unit 86.

As shown in FIG. 13B, the second preprocessing unit 86 of the narrow area smoothing unit 85 includes an absolute luminance calculation unit 86a, a relative luminance calculation unit 86b, an adjustment coefficient calculation unit 86c, and an adjustment value calculation unit 86d. The processing performed by these components is similar to the processing performed by the components of the first preprocessing unit 83, except for the size of the attention area $B_s$ including the target pixel. The absolute luminance calculation unit 86a outputs the luminance maximum value $V_{max-s}$ in the attention area $B_s$. The relative luminance calculation unit 86b calculates a luminance average value $V_{mean-s}$ by applying an averaging filter 86b1 to the luminance V in the attention area $B_s$, and determines a corresponding value $f_{v-s}$ corresponding to the luminance average value $V_{mean-s}$ by using the LUT 86b2. The adjustment coefficient calculation unit 86c applies an averaging filter 86c1 to the linear signal RGB in the attention area $B_s$ to calculate a gradation average value $RGB_{mean-s}$, and determines the adjustment coefficient $f_{a-s}$ corresponding to the gradation average value $RGB_{mean-s}$ by using the LUT 86c2.

The adjustment value calculation unit 86d sets the luminance lower limit value $V_{limit-s}$ based on equations (6) and (7).

$$V_{max-s} < f_{v-s} \Rightarrow V_{limit-s} = f_{v-s} \quad (6)$$

$$V_{max-s} \geq f_{v-s} \Rightarrow V_{limit-s} = V_{max-s} \quad (7)$$

Further, the adjustment value calculation unit 83d calculates the luminance information value $V'_s$ used in the narrow area smoothing unit 85 based on equation (8).

$$V'_s = 1 - f_{a-s} \times (1 - V_{limit-s}) \quad (8)$$

It is noted that the second preprocessing unit 86 is not limited to the above configuration, and may include only one or two of the absolute luminance calculation unit 86a, the relative luminance calculation unit 86b, and the adjustment coefficient calculation unit 86c.

<Absolute Luminance Calculation Unit 83a, 86a>

Figure 14A:
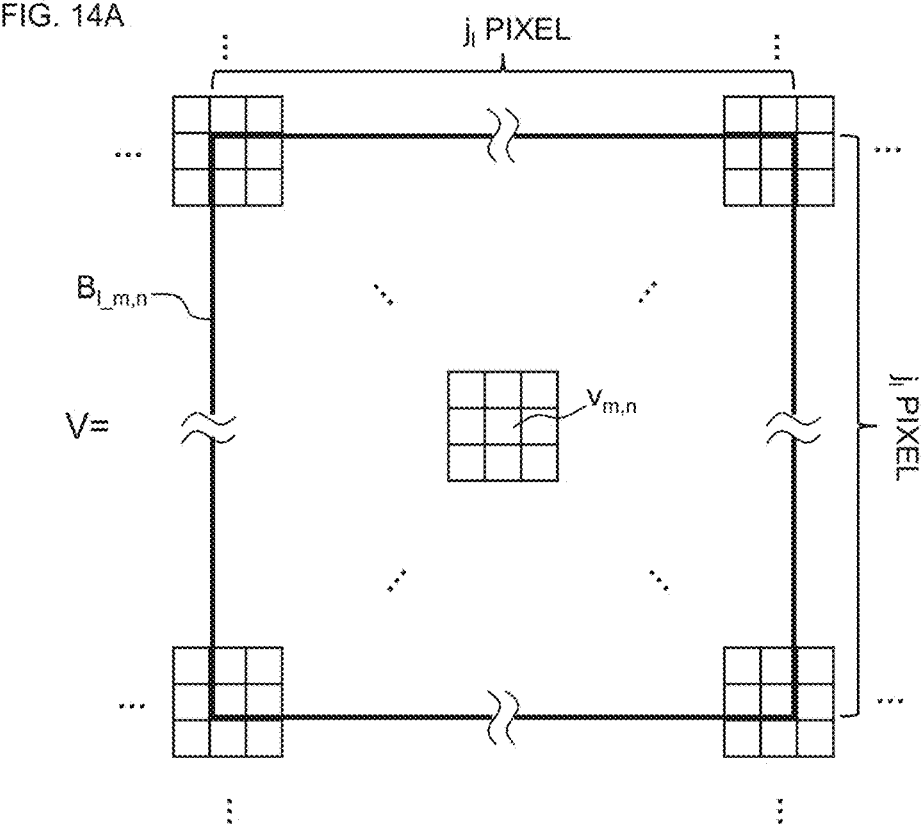
FIG. 14A is a schematic diagram showing a two-dimensional array of luminances V used in an absolute luminance calculation unit 83a and a relative luminance calculation unit 83b of the first preprocessing unit 83.

The processing for each target pixel in the absolute luminance calculation units 83a and 86a and the effects of the processing will be described in more detail. If the attention area corresponding to the target pixel $i_{m,n}$ in the first preprocessing unit 83 is expressed as $B_{l\_m,n}$, the attention area $B_{l\_m,n}$ is set to be an area approximately centered on the target pixel $i_{m,n}$ and including a total of $j_l \times j_l$ pixels including the target pixel $i_{m,n}$ and its surrounding pixels. In this embodiment, $j_l$ is set to 305. The absolute luminance calculation unit 83a of the first preprocessing unit 83 calculates the maximum value of luminance V of the attention area $B_{l\_m,n}$ indicated by the bold line in FIG. 14a as the luminance maximum value $v_{max-l\_m,n}$ for the target pixel $i_{m,n}$.

If the attention area corresponding to the target pixel $i_{m,n}$ in the second preprocessing unit 86 is expressed as $B_{s\_m,n}$, the attention area $B_{s\_m,n}$ is set to be an area approximately centered on the target pixel $i_{m,n}$ and including a total of $j_s \times j_s$ pixels including the target pixel $i_{m,n}$ and its surrounding pixels. In this embodiment, $j_s$ is set to 19. The absolute luminance calculation unit 86a of the second preprocessing unit 86 calculates the maximum value of the luminance V of the attention area $B_{s\_m,n}$ indicated by the bold line in FIG. 14B as the luminance maximum value $v_{max-s\_m,n}$ for the target pixel $i_{m,n}$.

If the smoothing processing is performed by using the luminance V output from the luminance conversion unit 81 as it is, the wide area smoothing value $v'_{mean-l\_m,n}$ and the narrow area smoothing value $v'_{mean-s\_m,n}$ may be smaller than the luminance $v_{m,n}$ before the smoothing processing. In such a case, a so-called black halo, in which peak luminance slows down in the displayed image and a vaguely dark area appears from a low gradation area to a high gradation area in the image, is perceived, and there is a possibility that the display quality of the high gradation area deteriorates. In this embodiment, the luminance maximum values $v_{max-l\_m,n}$, $v_{max-s\_m,n}$ calculated by the absolute luminance calculation units 83a and 86a function as a lower limit value of luminance to avoid reduction in luminance due to such smoothing processing. By calculating the luminance information values $v'_{l\_m,n}$, $v'_{s\_m,n}$ by using the luminance lower limit values $v_{limit-l\_m,n}$, $v_{limits\_m,n}$ for the target pixel $i_{m,n}$ set based on the luminance maximum values $v_{max-l\_m,n}$, $v_{max-s\_m,n}$, the wide area smoothing value $v'_{mean-l\_m}$ and the narrow area smoothing value $v'_{mean-s\_m,n}$ become values greater than or equal to the luminance $v_{m,n}$ before the smoothing processing, making it possible to suppress peak luminance dulling and black halo.

It is noted that the absolute luminance calculation units 83a and 86a are not limited to the above configuration. For example, the absolute luminance calculation units 83a and 86a may be configured to output the value obtained by performing further calculation processing on the luminance maximum value $v_{max-l\_m,n}$, $v_{max-s\_m,n}$, or output other representative values of luminance V in the attention areas $B_{l\_m,n}$, $B_{s\_m,n}$.

<Relative Luminance Calculation Units 83b, 86b>

The processing for each target pixel in the relative luminance calculation units 83b, 86b and the effects of the processing will be described in more detail. The relative luminance calculation unit 83b of the first preprocessing unit 83 applies an averaging filter 83b1 with a filter size of $j_l \times j_l$ to the luminance V of the attention area $B_{l\_m,n}$ in FIG. 14A to calculate the luminance average value $v_{mean-l\_m,n}$ corresponding to the target pixel $i_{m,n}$. Therefore, the luminance average value $V_{mean-l\_m,n}$ is a value obtained by dividing the sum of the luminance V of the pixels in the attention area $B_{l\_m,n}$ by $j_l \times j_l$. The LUT 83$b$2 used by the relative luminance calculation unit 83$b$ stores a corresponding value $f_{v-l}$ as output data associated with the luminance average value $V_{mean-l}$ as input data. By using such LUT 83$b$2, the corresponding value $f_{v-l\_m,n}$ for the target pixel $i_{m,n}$ is determined from the luminance average value $v_{mean-l\_m,n}$.

Figure 14B:
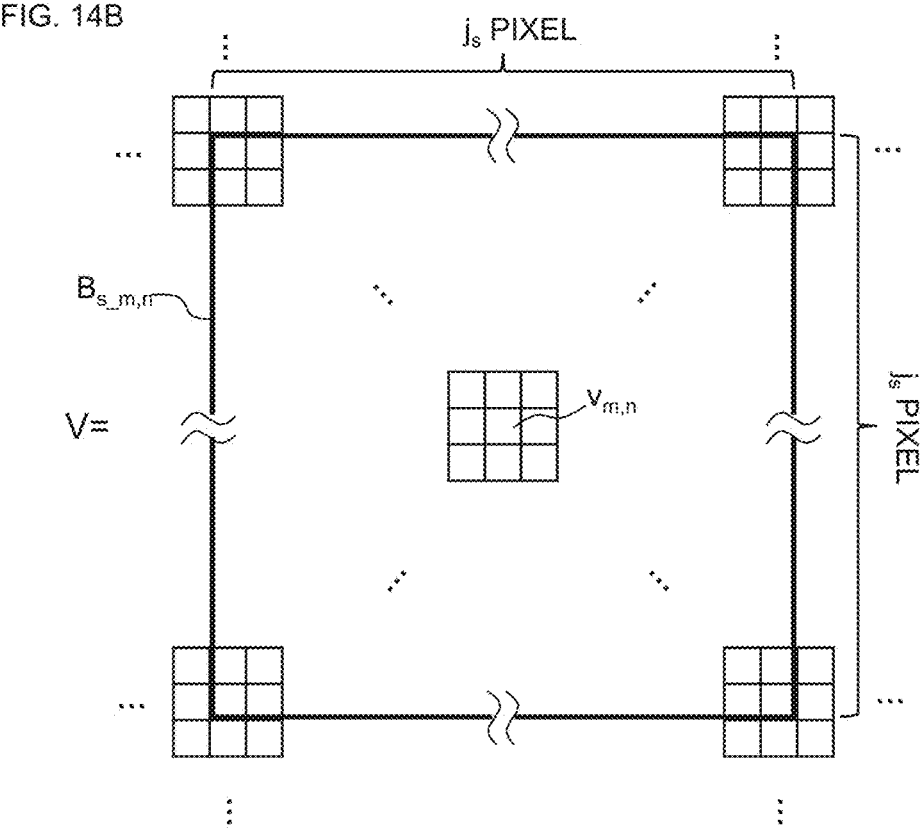
FIG. 14B is a schematic diagram showing a two-dimensional array of luminance V used in an absolute luminance calculation unit 86a and a relative luminance calculation unit 86b of the second preprocessing unit 86.

The relative luminance calculation unit 86$b$ of the second preprocessing unit 86 applies an averaging filter 86$b$1 with a filter size of $j_s \times j_s$ to the luminance V of the attention area $B_{s\_m,n}$ in FIG. 14B to calculate the luminance average value $v_{mean-s\_m,n}$ corresponding to target pixel $i_{m,n}$. Therefore, the luminance average value $v_{mean-s\_m,n}$ is a value obtained by dividing the sum of luminance V of pixels in the attention area $B_{s\_m,n}$ by $j_s \times j_s$. The LUT 86$b$2 used by the relative luminance calculation unit 86$b$ stores a corresponding value $f_{s-l}$ as output data associated with the luminance average value $V_{mean-s}$ as input data. By using such an LUT 86$b$2, the corresponding value $f_{s-l\_m,n}$ for the target pixel $i_{m,n}$ is determined from the luminance average value $v_{mean-s\_m,n}$.

By using the second panel 22, in other words, by reducing the gradation value of the second panel 22, it is possible to improve the display quality, especially in low gradation areas. On the other hand, if the area around the target pixel is a relatively high-luminance area, changes in the expressive power of the target pixel, which is relatively low-luminance, are difficult to perceive due to the presence of light diffused from the area. Therefore, the significance of using the second panel 22 is reduced. In this embodiment, the corresponding values $f_{v-l\_m,n}$, $f_{s-l\_m,n}$ determined by the relative luminance calculation units 83$b$ and 86$b$ function as a lower limit value of the luminance where the effect of improving the expressive power by using the second panel 22 can be expected at a perceivable level for the target pixel in the attention areas $B_{l\_m,n}$, $B_{s\_m,n}$. By calculating the luminance information values $v'_{l\_m,n}$, $v'_{s\_m,n}$ by using the luminance lower limit values $v_{limit-l\_m,n}$, $v_{limit-s\_m,n}$ for the target pixel $i_{m,n}$ set based on the corresponding values $f_{v-l\_m,n}$, $f_{s-l\_m,n}$, it is possible to minimize the use of the second panel 22 while enjoying the effect of improving the expressive power in low-luminance pixels.

Here, in the LUTs 83$b$2 and 86$b$2 used by the relative luminance calculation units 83$b$ and 86$b$, it is preferable that the corresponding values $f_{v-l}$ and $f_{v-s}$ are monotonically non-decreasing with respect to each of the luminance average values $V_{mean-l}$ and $V_{mean-s}$. With this configuration, the display quality is improved by using the second panel 22 in an area where the luminance average values $V_{mean-l}$, $V_{mean-s}$ are relatively low, and the use of the second panel 22 can be minimized in area where the luminance average values $V_{mean-l}$ and $V_{mean-s}$ are relatively high.

Figure 15:
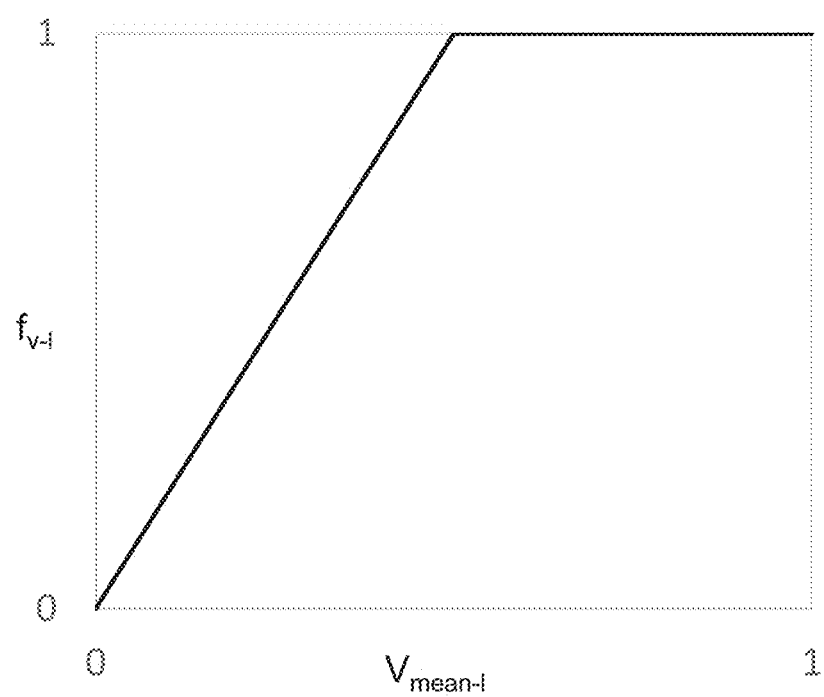
FIG. 15 is a graph showing an example of the relationship between the luminance average value $V_{mean-l}$ and the corresponding value $f_{v-l}$ in a LUT 83b2 of the relative luminance calculation unit 83b.

FIG. 15 is a graph showing an example of the relationship between the luminance average value $V_{mean-l}$ and the corresponding value $f_{v-l}$ in the LUT 83$b$2 of the relative luminance calculation unit 83$b$. As the luminance average value $V_{mean-l}$ increases, the corresponding value $f_{v-l}$ increases linearly, and the corresponding value $f_{v-l}$ remains constant at 1 on the side where the luminance average value $V_{mean-l}$ is relatively high. It is noted that the relationship between the luminance average value $V_{mean-l}$ and the corresponding value $f_{v-l}$ is not limited to this example, and may be a monotonically non-decreasing relationship in a curved manner, for example. Further, the relationship between the luminance average value $V_{mean-s}$ and the corresponding value $f_{v-s}$ in the LUT 86$b$2 of the relative luminance calculation unit 86$b$ may be the same as or different from the relationship between the luminance average value $V_{mean-l}$ and the corresponding value $f_{v-l}$ in the LUT 83$b$2 of the relative luminance calculation unit 83$b$.

It is note that the relative luminance calculation units 83$b$ and 86$b$ are not limited to the above configuration. By using, for example, a value obtained by further performing another calculation processing on the luminance average value $V_{mean-l\_m,n}$, $V_{mean-s\_m,n}$, or other representative values of luminance in the attention areas $B_{l\_m,n}$, $B_{s\_m,n}$ (for example, median value, mode value, value weighted by using a Gaussian filter), a configuration may also be adopted where the corresponding values $f_{v-l\_m,n}$ and $f_{s-l\_m,n}$ are determined.

<Adjustment Coefficient Calculation Units 83$c$, 86$c$>

The processing for each target pixel in the adjustment coefficient calculation units 83$c$, 86$c$ and the effects of the processing will be described in more detail. The adjustment coefficient calculation unit 83$c$ of the first preprocessing unit 83 applies an averaging filter 83$c$1 with a filter size of $j_l \times j_l$ to the linear signal RGB of the attention area $B_{l\_m,n}$, and calculates a gradation average value $RGB_{mean-l\_m,n}$ corresponding to the target pixel $i_{m,n}$. In this embodiment, by calculating the average value of the gradation values of color components for each pixel of the attention area $B_{l\_m,n}$ and applying the averaging filter 83$c$1 to the average value, the gradation average value $RGB_{mean-l\_m,n}$ is calculated. The LUT 83$c$2 used by the adjustment coefficient calculation unit 83$c$ stores the adjustment coefficient $f_{a-l}$ as output data associated with the gradation average value $RGB_{mean-l}$ as input data. By using such LUT 83$c$2, the adjustment coefficient $f_{a-l\_m,n}$ for the target pixel $i_{m,n}$ is determined from the gradation average value $RGB_{mean-l\_m,n}$.

The adjustment coefficient calculation unit 86$c$ of the second preprocessing unit 86 applies an averaging filter 86$c$1 with a filter size of $j_s \times j_s$ to the linear signal RGB of the attention area $B_{s\_m,n}$, and calculates a gradation average value $RGB_{mean-s\_m,n}$ corresponding to the target pixel $i_{m,n}$. In this embodiment, by calculating the average value of the gradation values of color components for each pixel of the attention area $B_{s\_m,n}$ and applying the averaging filter 86$c$1 to the average value, the gradation average value $RGB_{mean-s\_m,n}$ is calculated. The LUT 86$c$2 used by the adjustment coefficient calculation unit 86$c$ stores an adjustment coefficient $f_{a-s}$ as output data associated with the gradation average value $RGB_{mean-s}$ as input data. By using such LUT 86$c$2, the adjustment coefficient $f_{a-s\_m,n}$ for the target pixel $i_{m,n}$ is determined from the gradation average value $RGB_{mean-s\_m,n}$.

The effect of improving the expressive power by using the second panel 22 also changes depending on the gradation value of each color component of the pixel. In this embodiment, the adjustment coefficients $f_{a-l\_m,n}$, $f_{a-s\_m,n}$ determined by the adjustment coefficient calculation units 83$c$, 86$c$ function as a coefficient that reflects the degree of necessity of the second panel 22 based on the gradation value of the color component for the target pixel $i_{m,n}$ in the attention areas $B_{l\_m,n}$, $B_{s\_m,n}$. Therefore, by calculating the luminance information values $v'_{l\_m,n}$, $v'_{s\_m,n}$ by using the adjustment coefficients $f_{a-l\_m,n}$, $f_{a-s\_m,n}$, it is possible to minimize the use of the second panel 22 while enjoying the effect of improving display quality in the low gradation area.

Here, in the LUTs 83$c$2 and 86$c$2 used by the adjustment coefficient calculation units 83$c$ and 86$c$, it is preferable that the adjustment coefficients $f_{a-l}$ and $f_{a-s}$ are monotonically non-increasing with respect to each of the gradation average values $RGB_{mean-l}$ and $RGB_{mean-s}$. With this configuration, it is possible to improve the display quality by using the second panel 22 in an area where the gradation average values $RGB_{mean-l}$, $RGB_{mean-s}$ are relatively low, and to keep the use of the second panel 22 to a minimum in an area where the gradation average values $RGB_{mean-l}$ and $RGB_{mean-s}$ are relatively high.

Figure 16:
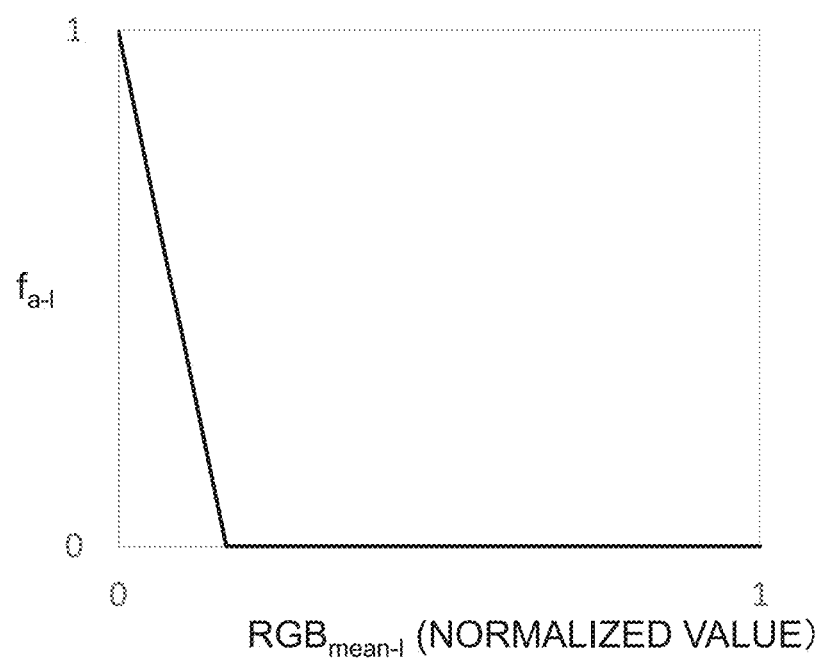
FIG. 16 is a graph showing an example of the relationship between the gradation average value $RGB_{mean-l}$ and the adjustment coefficient $f_{a-l}$ in a LUT 83c2 of an adjustment coefficient calculation unit 83c.

FIG. 16 is a graph showing an example of the relationship between the gradation average value $RGB_{mean-l}$ and the adjustment coefficient $f_{a-l}$ in the LUT 83c2 of the adjustment coefficient calculation unit 83c. The horizontal axis indicates a value obtained by normalizing the gradation average value $RGB_{mean-l}$ within a range of 0 or more and 1 or less. The adjustment coefficient $f_{a-l}$ decreases linearly as the average gradation value $RGB_{mean-l}$ increases, and the adjustment coefficient $f_{a-l}$ is constant at 0 on the side where the gradation average value $RGB_{mean-l}$ is relatively high. It is noted that the relationship between the gradation average value $RGB_{mean-l}$ and the adjustment coefficient $f_{a-l}$ is not limited to this example, and may be a relationship that is monotonically non-increasing in a curved manner, for example. Further, the relationship between the gradation average value $RGB_{mean-s}$ and the adjustment coefficient $f_{a-s}$ in the LUT 86c2 of the adjustment coefficient calculation unit 86c may be the same as or different from the relationship between the gradation average value $RGB_{mean-l}$ and the adjustment coefficient $f_{a-l}$ in the LUT 83c2 of the adjustment coefficient calculation unit 83c.

It is noted that the adjustment coefficient calculation units 83c and 86c are not limited to the above configuration. For example, the signal values of the linear signals RGB corresponding to each color component may be weighted in consideration of the difference in sensitivity of each color component depending on the observer and the optical characteristics of the display panel, and the averaging filters 83c1 and 86c1 may be applied to the weighted signal values. In addition, a configuration where the adjustment coefficients $f_{a-l\_m,n}$ and $f_{a-s\_m,n}$ are determined may be adopted by using other representative values of the gradation values in the attention areas $B_{l\_m,n}$, $B_{s\_m,n}$ (for example, the median value, the mode value, the value weighted by using a Gaussian filter).

<Attention Area>

It is preferable that the attention area $B_{l\_m,n}$ corresponding to the target pixel $i_{m,n}$ in the absolute luminance calculation unit 83a, relative luminance calculation unit 83b, and adjustment coefficient calculation unit 83c of the first preprocessing unit 83 is set to be the same as the target area $A_{l\_m,n}$ in the first smoothing processing unit 84 or an area larger than the target area $A_{l\_m,n}$. Similarly, it is preferable that the attention area $B_{s\_m,n}$ corresponding to the target pixel $i_{m,n}$ in the absolute luminance calculation unit 83a, relative luminance calculation unit 83b, and adjustment coefficient calculation unit 83c of the second preprocessing unit 86 is set to be the same as the target area $A_{s\_m,n}$ in the second smoothing processing unit 87 or an area larger than the target area $A_{s\_m,n}$.

By making the attention areas $B_{l\_m,n}$, $B_{s\_m,n}$ the same as the target areas $A_{l\_m,n}$, $A_{s\_m,n}$ in each smoothing processing unit 84, 87, when the target pixel $i_{m,n}$ is viewed from the front, the above-mentioned effects related to the absolute luminance calculation units 83a, 86a, the relative luminance calculation units 83b, 86b, and the adjustment coefficient calculation units 83c, 86c can be enjoyed. Furthermore, by enlarging the attention areas $B_{l\_m,n}$, $B_{s\_m,n}$ more than the target areas $A_{l\_m,n}$, $A_{s\_m,n}$ in each smoothing processing unit 84, 87, even when the target pixel $i_{m,n}$ is viewed from an oblique direction, the above-mentioned effects related to the absolute luminance calculation units 83a, 86a, relative luminance calculation units 83b, 86b, and adjustment coefficient calculation units 83c, 86c can be enjoyed. It is noted that if the amount of expansion of the attention areas $B_{l\_m,n}$, $B_{s\_m,n}$ with respect to the target areas $A_{l\_m,n}$, $A_{s\_m,n}$ in each smoothing processing unit 84, 87 is too large, problems such as a white halo are likely to occur.

Therefore, considering the likelihood of the problem occurring depending on the conditions of the actual display panel, it is preferable to slightly enlarge the attention areas $B_{l\_m,n}$, $B_{s\_m,n}$ with respect to the target areas $A_{l\_m, n}$, $A_{s\_m, n}$ in each of the smoothing processing units 84 and 87. When enlarging the attention areas $B_{l\_m, n}$, $B_{s\_m, n}$ by h pixels in the row direction and column direction with respect to each of the target areas $A_{l\_m, n}$, $A_{s\_m, n}$ in each smoothing processing unit 84, 87, for example, $1 \leq h \leq 15$, preferably $1 \leq h \leq 10$, and in this embodiment, h is 4. Specifically, h is, for example, 1, 2, 3, 4, 5, 6, 7, 8, 9, 10, 11, 12, 13, 14, 15, and may range between any two of the numbers illustrated here.

It is noted that in the present embodiment, in the absolute luminance calculation unit 83a, the relative luminance calculation unit 83b, and the adjustment coefficient calculation unit 83c of the first preprocessing unit 83, the attention area $B_{l\_m,n}$ corresponding to the target pixel $i_{m,n}$ are made the same, and in the absolute luminance calculation unit 86a, relative luminance calculation unit 86b, and adjustment coefficient calculation unit 86c of the second preprocessing unit 86, the attention area $B_{s\_m,n}$ corresponding to the target pixel $i_{m,n}$ are made the same. The manner where the attention areas $B_{l\_m,n}$, $B_{s\_m,n}$ are set is not limited to this. For example, the attention areas in the absolute luminance calculation unit 83a, relative luminance calculation unit 83b, and adjustment coefficient calculation unit 83c of the first preprocessing unit 83, and the attention areas in the absolute luminance calculation unit 86a, relative luminance calculation unit 86b, and the adjustment coefficient calculation unit 86c of the second preprocessing unit 86 may be set to be different from each other.

4. OTHER EMBODIMENT

The present invention also can provide a program for causing a computer or a processor provided in a display device to execute a method of displaying an image on the display device, wherein the method comprises a wide area smoothing step, a narrow area smoothing step, a blending step, and a display step, the display device includes a light source and a plurality of display panels arranged in a stacked manner, the plurality of display panels include a first panel and a second panel disposed between the light source and the first panel, in the wide area smoothing step, a wide area smoothing value obtained by performing a smoothing processing on a luminance information value of a target area including a target pixel in an input image and surrounding pixels of the target pixel is output, in the narrow area smoothing step, a narrow area smoothing value obtained by performing a smoothing processing on a luminance information value of a target area that includes the target pixel and surrounding pixels of the target pixel and is smaller than the target area in the wide area smoothing step is output, in the blending step, a blend value obtained by blending the wide area smoothing value and the narrow area smoothing value at a predetermined blending rate is output, in the display step, an image generated using the blend value is displayed on a second panel, and the luminance information value is generated using a luminance of a pixel. The program may be stored in a built-in storage unit or in a non-transitory computer-readable storage medium. Alternatively, it may be realized through so-called cloud computing by reading programs stored in external storage.

In the above embodiment, the linear conversion unit 31 is configured to receive the input signal RGBγ where the gradation is expressed by 10 bits for each of the R, G, and B components as input image data, but the format of input image data is not limited to this. As an example, an input signal where the gradation is expressed by 8 bits for each of the R, G, and B components may be used as the input image data.

In the above embodiment, rectangular areas are set as the target areas $A_{l\_m,n}$, $A_{s\_m,n}$, the neighboring area $A_{n\_m,n}$, and the attention areas $B_{l\_m,n}$, $B_{s\_m,n}$ corresponding to the target pixel $i_{m,n}$, but the shape of each area is not limited to this. Preferably, each area is set to have a line-symmetrical shape in each of the row and column directions, with the target pixel $i_{m,n}$ approximately at the center. For example, each area may be set to have a substantially elliptical shape or a substantially elliptical shape approximately centered on the target pixel $i_{m,n}$.

Although various embodiments according to the present invention were described above, these are presented as examples and are not intended to limit the scope of the invention. The new embodiment can be implemented in various other forms, and various omissions, substitutions, and changes can be made without departing from the gist of the invention. These embodiments and their modifications are included within the scope and gist of the invention, as well as within the scope of the invention described in the claims and its equivalents.

REFERENCE SIGNS LIST

1: display device, 2: display unit, 3: image processing unit, 4: first image generation unit, 5: first main processing unit, 6: first nonlinear conversion unit, 7: second image generation unit, 8: second main processing unit, 9: second nonlinear conversion unit, 21: first panel, 22: second panel, 23: light source, 31: linear conversion unit, 51: coefficient calculation unit, 52: calculation unit, 81: luminance conversion unit, 82: wide area smoothing unit, 83: first preprocessing unit, 83a: absolute luminance calculation unit, 83b: relative luminance calculation unit, 83b1: averaging filter, 83c: adjustment coefficient calculation unit, 83c1: averaging filter, 83d: adjustment value calculation unit, 84: first smoothing processing unit, 85: narrow area smoothing unit, 86: second preprocessing unit, 86a: absolute luminance calculation unit, 86b: relative luminance calculation unit, 86b1: averaging filter, 86c: adjustment coefficient calculation unit, 86c1: averaging filter, 86d: adjustment value calculation unit, 87: second smoothing processing unit, 88: blending unit, 88a: blending rate determining unit, 88a1: LPF, 88b: blending processing unit, p1: pixel, p2: pixel

The invention claimed is:

1. A display device that displays an image, comprising:
a light source;
a plurality of display panels arranged in a stacked manner;
a wide area smoothing unit;
a narrow area smoothing unit; and
a blending unit, wherein
the plurality of display panels include a first panel and a second panel disposed between the light source and the first panel,
the wide area smoothing unit outputs a wide area smoothing value obtained by performing a smoothing processing on a luminance information value of a target area including a target pixel and surrounding pixels of the target pixel in an input image,
the narrow area smoothing unit outputs a narrow area smoothing value obtained by performing a smoothing processing on a luminance information value of a target area that includes the target pixel and surrounding pixels of the target pixel and is smaller than the target area of the wide area smoothing unit,
the smoothing processing is a process that smooths changes in luminance information values,
the blending unit outputs a blend value obtained by blending the wide area smoothing value and the narrow area smoothing value at a predetermined blending rate that is used to weight each smoothing value,
the blending unit includes a blending rate determining unit and a blending processing unit,
the blending rate determining unit calculates a luminance level using a luminance of the target pixel or a luminance of a neighboring area including the target pixel and neighboring pixels of the target pixel, and determines the blending rate based on the luminance level, and
the blending processing unit outputs the blend value using the blending rate,
the second panel displays an image generated using the blend value, and
the luminance information value is generated using a luminance of a pixel.

2. The display device of claim 1, wherein
the blending rate determining unit determines the blending rate so that the blending rate of the wide area smoothing value is monotonically non-decreasing with respect to the luminance level.

3. The display device of claim 1, wherein
the wide area smoothing unit includes a first preprocessing unit and a first smoothing processing unit,
the first preprocessing unit generates the luminance information value used in the wide area smoothing unit by using at least one selected from a luminance of each pixel in an area including at least the target area of the wide area smoothing unit and a representative value of the luminance of each pixel, and
the first smoothing processing unit outputs the wide area smoothing value obtained by performing smoothing processing on the luminance information value.

4. The display device of claim 3, wherein
the first preprocessing unit generates the luminance information value of the target area of the wide area smoothing unit by further using a gradation value of a color component of each pixel.

5. The display device of claim 1, wherein
the narrow area smoothing unit includes a second preprocessing unit and a second smoothing processing unit,
the second preprocessing unit generates the luminance information value used in the narrow area smoothing unit by using at least one selected from a luminance of each pixel in an area including at least the target area of the narrow area smoothing unit, and a representative value of the luminance of each pixel, and
the second smoothing processing unit outputs the narrow area smoothing value obtained by performing smoothing processing on the luminance information value.

6. The display device of claim 5, wherein
the second preprocessing unit generates the luminance information value of the target area of the narrow area smoothing unit by further using a gradation value of a color component of each pixel in the area including at least the target area of the narrow area smoothing unit.

7. The display device of claim 1, wherein the smoothing processing is a processing using an averaging filter.

8. A method of displaying an image on a display device, comprising:
a wide area smoothing step; a narrow area smoothing step; a blending step; and a display step, wherein
the display device includes a light source and a plurality of display panels arranged in a stacked manner,
the plurality of display panels include a first panel and a second panel disposed between the light source and the first panel,
in the wide area smoothing step, a wide area smoothing value obtained by performing a smoothing processing on a luminance information value of a target area including a target pixel and surrounding pixels of the target pixel in an input image is output,
in the narrow area smoothing step, a narrow area smoothing value obtained by performing a smoothing processing on a luminance information value of a target area that includes the target pixel and surrounding pixels of the target pixel and is smaller than the target area in the wide area smoothing step is output,
the smoothing processing is a process that smooths changes in luminance information values,
in the blending step, a blend value obtained by blending the wide area smoothing value and the narrow area smoothing value at a predetermined blending rate that is used to weight each smoothing value is output,
the blending step includes a blending rate determining step and a blending processing step,
in the blending rate determining step, calculates a luminance level is calculated using a luminance of the target pixel or a luminance of a neighboring area including the target pixel and neighboring pixels of the target pixel, and the blending rate is determined based on the luminance level, and
in the blending processing step, the blend value is output using the blending rate,
in the display step, an image generated using the blend value is displayed on the second panel, and
the luminance information value is generated using a luminance of a pixel.

9. A non-transitory computer-readable storage medium storing a program for causing a computer or a processor provided in a display device to execute a method of displaying an image on the display device, wherein
the method comprises a wide area smoothing step, a narrow area smoothing step, a blending step, and a display step,
the display device includes a light source and a plurality of display panels arranged in a stacked manner,
the plurality of display panels include a first panel and a second panel disposed between the light source and the first panel,
in the wide area smoothing step, a wide area smoothing value obtained by performing a smoothing processing on a luminance information value of a target area including a target pixel and surrounding pixels of the target pixel in an input image is output,
in the narrow area smoothing step, a narrow area smoothing value obtained by performing a smoothing processing on a luminance information value of a target area that includes the target pixel and surrounding pixels of the target pixel and is smaller than the target area in the wide area smoothing step is output,
the smoothing processing is a process that smooths changes in luminance information values,
in the blending step, a blend value obtained by blending the wide area smoothing value and the narrow area smoothing value at a predetermined blending rate that is used to weight each smoothing value is output,
the blending step includes a blending rate determining step and a blending processing step,
in the blending rate determining step, calculates a luminance level is calculated using a luminance of the target pixel or a luminance of a neighboring area including the target pixel and neighboring pixels of the target pixel, and the blending rate is determined based on the luminance level, and
in the blending processing step, the blend value is output using the blending rate,
in the display step, an image generated using the blend value is displayed on the second panel, and
the luminance information value is generated using a luminance of a pixel.

* * * * *